United States Patent
Shi et al.

(10) Patent No.: US 11,387,903 B2
(45) Date of Patent: Jul. 12, 2022

(54) APT SUBSYSTEM AND SPACECRAFT COMMUNICATIONS SYSTEM

(71) Applicant: Huawei Technologies Co., Ltd., Shenzhen (CN)

(72) Inventors: Xueliang Shi, Hangzhou (CN); Bin Wang, Hangzhou (CN); Jun Wang, Hangzhou (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 17/244,484

(22) Filed: Apr. 29, 2021

(65) Prior Publication Data
US 2021/0266068 A1 Aug. 26, 2021

Related U.S. Application Data

(63) Continuation of application No. PCT/CN2019/114310, filed on Oct. 30, 2019.

(30) Foreign Application Priority Data

Oct. 30, 2018 (CN) .......................... 201811278938.4

(51) Int. Cl.
*H04B 10/118* (2013.01)
*H04B 10/112* (2013.01)
*H04B 10/40* (2013.01)

(52) U.S. Cl.
CPC ....... *H04B 10/118* (2013.01); *H04B 10/1123* (2013.01); *H04B 10/40* (2013.01)

(58) Field of Classification Search
None
See application file for complete search history.

(56) References Cited

U.S. PATENT DOCUMENTS

2001/0055389 A1* 12/2001 Hughes ................. H04B 10/70 380/44
2002/0167702 A1* 11/2002 Badesha ................ B64G 5/00 398/121

(Continued)

FOREIGN PATENT DOCUMENTS

CN 101072085 A 11/2007
CN 102854537 A 1/2013

(Continued)

OTHER PUBLICATIONS

Lin, W., "Design and Performance Analysis of Terahertz Space Communication System" (with English Abstract), A Thesis Submitted in Partial Fulfillment of the Requirements for the Degree of Master of Engineering, Huazhong University of Science and Technology, WuHan 430074, P.R. China, May 2008, 57 pages.

(Continued)

*Primary Examiner* — Darren E Wolf
(74) *Attorney, Agent, or Firm* — Slater Matsil, LLP

(57) ABSTRACT

This application relates to the field of space communications technologies, and provides an acquisition, pointing, and tracking (APT) subsystem and a spacecraft communications system. The APT subsystem includes a first controller, a first terahertz transceiver, and a terahertz antenna array that are sequentially connected, where the first terahertz transceiver is configured to modulate and demodulate a terahertz wave; the terahertz antenna array is configured to send and receive the terahertz wave; and the first controller is configured to control the first terahertz transceiver to acquire, point, and track another APT subsystem by using the terahertz antenna array.

13 Claims, 9 Drawing Sheets

(56) References Cited

U.S. PATENT DOCUMENTS

| | | |
|---|---|---|
| 2005/0200550 A1 | 9/2005 | Vetrovec et al. |
| 2007/0031151 A1* | 2/2007 | Cunningham ..... H04B 10/1123 398/131 |
| 2010/0134372 A1 | 6/2010 | Ryu et al. |
| 2010/0220390 A1* | 9/2010 | Wein ................ G02B 27/644 359/429 |
| 2011/0096696 A1 | 4/2011 | Hunt |
| 2016/0048399 A1 | 2/2016 | Shaw |

FOREIGN PATENT DOCUMENTS

| | | |
|---|---|---|
| CN | 103052084 A | 4/2013 |
| CN | 103376672 A | 10/2013 |
| CN | 103765792 A | 4/2014 |
| CN | 104160640 A | 11/2014 |
| CN | 104796919 A | 7/2015 |
| CN | 105161807 A | 12/2015 |
| CN | 105449377 A | 3/2016 |
| CN | 105553539 A | 5/2016 |
| CN | 105897324 A | 8/2016 |
| EP | 1645846 A1 | 4/2006 |
| JP | 2003069509 A | 3/2003 |
| JP | 2006333068 A | 12/2006 |
| JP | 2018136303 A | 8/2016 |

OTHER PUBLICATIONS

Koshelets, V.P. et al., "Superconducting Integrated THz Receiver", 35th International Conference on Infrared, Millimeter, and Terahertz Waves, Oct. 28, 2010, 1 page.

Shi, C., "The Realiation of ATP in the System of FSO" (with English Abstract), Engineering Master Degree Thesis of Beijing University of Posts and Telecommunications, Dec. 2007, 79 pages.

Li, J. et al., "Terahertz Communication Technology Research Status and Prospects" (with English Abstract), Communications Technology, vol. 47, No. 4, Apr. 2014, 6 pages.

Ding, Y. et al., "Analysis of tracking-pointing error and platform vibration effect in inter-satellite terahertz communication system", IEEE Chinese Automation Congress (CAC), Oct. 20-22, 2017, pp. 430-434.

* cited by examiner

APT SUBSYSTEM AND SPACECRAFT COMMUNICATIONS SYSTEM

CROSS-REFERENCE TO RELATED APPLICATIONS

This application is a continuation of International Application No. PCT/CN2019/114310, filed on Oct. 30, 2019, which claims priority to Chinese Patent Application No. 201811278938.4, filed on Oct. 30, 2018. The disclosures of the aforementioned applications are hereby incorporated by reference in their entireties.

TECHNICAL FIELD

This application relates to the field of space communications technologies, and in particular, to an APT subsystem and a spacecraft communications system.

BACKGROUND

With the development and application of space technologies, especially orbital carrier and satellite communications technologies, inter-satellite communications technologies become an important part of modern communications technologies.

A conventional inter-satellite communications system (which is also referred to as an inter-satellite link communications system, inter-satellite communications system for short) that uses inter-satellite (in other words, satellite-to-satellite) communications technologies may include: an acquisition, pointing, and tracking (APT) subsystem and a communications subsystem. The communications subsystem is responsible for inter-satellite information transmission and is a main part of the inter-satellite communications system. The APT subsystem is responsible for acquisition, pointing, and tracking (which is also referred to as tracing) between satellites.

Currently, an APT subsystem is usually an optical system. The optical system performs acquisition, pointing, and tracking actions by using a laser. The optical system includes an optical antenna, a stepper motor, an optical lens, a plurality of detectors, and the like. An aperture of the optical antenna is fixed, and an antenna direction of the optical antenna is adjusted through the stepper motor.

However, because the laser is susceptible to external vibration, pointing difficulty is high, and energy efficiency of the laser serving as an information carrier is relatively low. Consequently, acquisition, pointing, and tracking efficiency of the foregoing APT subsystem is relatively low.

SUMMARY

Embodiments of this application provide an APT subsystem and a spacecraft communications system, to resolve a problem of relatively low acquisition, pointing, and tracking efficiency of a current APT subsystem. The technical solutions are as follows:

According to a first aspect, an APT subsystem is provided. The APT subsystem includes: a first controller, a first terahertz transceiver, and a terahertz antenna array that are sequentially connected, where the first terahertz transceiver is configured to modulate and demodulate a terahertz wave; the terahertz antenna array is configured to send and receive the terahertz wave; and the first controller is configured to control the first terahertz transceiver to acquire, point, and track another APT subsystem by using the terahertz antenna array.

In the APT subsystem provided in this embodiment of this application, because the first controller controls the first terahertz transceiver to acquire, point, and track the terahertz wave by using the terahertz antenna array, and the terahertz wave is not susceptible to external vibration, pointing difficulty is relatively low, and energy efficiency is relatively high. Therefore, acquisition, pointing, and tracking efficiency of the APT subsystem is improved.

Optionally, the terahertz antenna array is a beamforming antenna array, for example, a phased array beamforming antenna array. The terahertz antenna array may control beamforming of an antenna by adjusting a phase. The terahertz antenna array includes a first beamforming network and an antenna array that are connected to each other; the first terahertz transceiver is configured to: modulate a to-be-sent first terahertz wave, and send a modulated first terahertz wave to the first beamforming network, and the first beamforming network is configured to: perform beamforming processing on the modulated first terahertz wave, and send a processed first terahertz wave to the antenna array; the antenna array is configured to send the processed first terahertz wave; the antenna array is further configured to: receive a second terahertz wave, and send the second terahertz wave to the first beamforming network; the first beamforming network is further configured to: perform beamforming processing on the second terahertz wave to obtain a processed second terahertz wave, and send the processed second terahertz wave to the first terahertz transceiver; and the first terahertz transceiver is further configured to perform demodulation processing on the processed second terahertz wave.

In this embodiment of this application, the APT subsystem may have a plurality of composition architectures. The following two composition architectures are used as examples for description in this embodiment of this application.

In a first composition architecture, the first terahertz transceiver includes a terahertz transceiver that supports a first frequency band, the first beamforming network includes a beamforming network that supports the first frequency band, and the terahertz transceiver, the beamforming network, and the antenna array are sequentially connected; and the first controller is further configured to: control, in an acquisition phase, the beamforming network to perform terahertz wave beamforming processing by using a first beamwidth; and control, in a tracking phase and a pointing phase, the beamforming network to perform terahertz wave beamforming processing by using a second beamwidth, where the second beamwidth is greater than the first beamwidth.

In the acquisition phase, the first controller sets a beamwidth of the antenna array to a relatively wide width by using the beamforming network, and a corresponding beam angle is also relatively large. This ensures a relatively large acquisition range and a relatively large electromagnetic wave transmission range, and ensures that an electromagnetic wave of another APT subsystem can be quickly detected, or an electromagnetic wave transmitted by the APT subsystem can be quickly detected by another APT subsystem, so that an acquisition probability is improved. In the pointing phase and the tracking phase, the first controller sets the beamwidth of the antenna array to a relatively narrow width by using the beamforming network, and a corresponding beam angle is also relatively small. This ensures accurate pointing and real-time tracking. Therefore, in the APT subsystem provided in this embodiment of this application, adaptive beamwidths are used in different phases, to achieve coarse adjustment before fine adjustment of the beamwidth, so that effective acquisition, pointing, and tracking are implemented, and flexibility of acquisition, pointing, and tracking is improved.

In a second composition architecture, the first terahertz transceiver includes a terahertz transceiver that supports a second frequency band and a terahertz transceiver that supports a third frequency band, the first beamforming network includes a beamforming network that supports the second frequency band and a beamforming network that supports the third frequency band, the antenna array includes a set of multi-band antenna arrays, the terahertz transceiver that supports the second frequency band, the beamforming network that supports the second frequency band, and the multi-band antenna array are sequentially connected, the terahertz transceiver that supports the third frequency band, the beamforming network that supports the third frequency band, and the multi-band antenna array are sequentially connected, and a center frequency of the second frequency band is less than a center frequency of the third frequency band; and the first controller is configured to: control, in a coarse tracking phase, working of the terahertz transceiver that supports the second frequency band, where the coarse tracking phase is a phase in which tracking precision of the terahertz transceiver that supports the second frequency band meets an acquisition requirement after an acquisition phase of the terahertz transceiver that supports the second frequency band starts, or the coarse tracking phase is a phase within preset duration after a start moment of an acquisition phase of the terahertz transceiver that supports the second frequency band; and control, in a fine tracking phase, working of the terahertz transceiver that supports the third frequency band, where the fine tracking phase is a phase that is adjacent to and located after the coarse tracking phase in a time sequence.

By using the foregoing control process, the first controller can eliminate disadvantages of different frequencies, and uses a frequency advantage of each frequency band as much as possible, to implement a combination of coarse tracking and fine tracking, and improve flexibility of acquisition, pointing, and tracking.

Further, the first controller is configured to: control, in an acquisition phase of each terahertz transceiver, a beamforming network connected to the terahertz transceiver to perform terahertz wave beamforming processing by using a third beamwidth; and control, in a tracking phase and a pointing phase of each terahertz transceiver, the beamforming network connected to the terahertz transceiver to perform terahertz wave beamforming processing by using a fourth beamwidth, where the third beamwidth is greater than the fourth beamwidth.

In the acquisition phase of each terahertz transceiver, the first controller sets a beamwidth of the antenna array to a relatively wide width by using the beamforming network, and a corresponding beam angle is also relatively large. Therefore, a relatively large acquisition range and a relatively large terahertz wave transmission range can be ensured. This ensures that a terahertz wave of another APT subsystem can be quickly detected, or a terahertz wave transmitted by the APT subsystem can be quickly detected by another APT subsystem, so that an acquisition probability is improved. In the pointing phase and the tracking phase of each terahertz transceiver, the first controller sets the beamwidth of the antenna array to a relatively narrow width by using the beamforming network, and a corresponding beam angle is also relatively small. In this way, accurate pointing and real-time tracking can be ensured. Therefore, in the APT subsystem provided in this embodiment of this application, adaptive beamwidths are used in different phases of the terahertz transceivers that support different frequency bands, to achieve coarse adjustment before fine adjustment of the beamwidth, so that effective acquisition, pointing, and tracking are implemented, and flexibility of acquisition, pointing, and tracking is improved.

According to a second aspect, a spacecraft communications system is provided. The spacecraft communications system includes: the APT subsystem according to the first aspect; and a communications subsystem, where the communications subsystem is configured to communicate with another communications subsystem in a spacecraft communications system in which another APT subsystem tracked by the APT subsystem is located.

In conclusion, in the spacecraft communications system provided in this embodiment of this application, because the APT subsystem uses a terahertz wave for acquisition, pointing, and tracking, and the terahertz wave is not susceptible to external vibration, pointing difficulty is relatively low, and energy efficiency is relatively high. Therefore, acquisition, pointing, and tracking efficiency of the APT subsystem is improved.

Optionally, the communications subsystem includes: a second controller, a second terahertz transceiver, and a terahertz antenna array that are sequentially connected, where the second terahertz transceiver is configured to modulate and demodulate a terahertz wave; the terahertz antenna array is configured to send and receive the terahertz wave; and the second controller is configured to control the second terahertz transceiver to communicate with the another communications subsystem by using the terahertz antenna array.

In the communications subsystem provided in this embodiment of this application, because the second controller controls the second terahertz transceiver to perform communication by using the terahertz antenna array, and the terahertz wave has many advantages such as a narrow beam, good directivity, and relatively high energy efficiency, communication efficiency of the communications subsystem is improved.

Optionally, the terahertz antenna array is a beamforming antenna array, for example, a phased array beamforming antenna array. The terahertz antenna array of the communications subsystem includes a second beamforming network and an antenna array that are connected to each other; the second terahertz transceiver is configured to modulate a to-be-sent third terahertz wave, and send a modulated third terahertz wave to the second beamforming network, and the second beamforming network is configured to: perform beamforming processing on the modulated third terahertz wave, and send a processed third terahertz wave to the antenna array; the antenna array is configured to send the processed third terahertz wave; the antenna array is further configured to: receive a fourth terahertz wave, and send the fourth terahertz wave to the second beamforming network; the second beamforming network is further configured to: perform beamforming processing on the fourth terahertz wave to obtain a processed fourth terahertz wave, and send the processed fourth terahertz wave to the second terahertz transceiver; and the second terahertz transceiver is further configured to perform demodulation processing on the processed fourth terahertz wave.

For the communications subsystem, a beamforming antenna array may be used to receive and send a terahertz wave in a beamforming manner, to implement precise point-to-point communication. This can effectively reduce interference to another communications subsystem, and ensure high gain and high directivity of a transmit antenna and a receive antenna without using any mechanical structure, so that a system structure is simple and easy to implement.

Optionally, the communications system further includes: a central controller, where the central controller is separately connected to the first controller and the second controller, or the first controller and the second controller are integrated into the central controller; the APT subsystem and the communications subsystem share a set of multi-band antenna arrays, so that an overall volume and weight of the spacecraft communications system can be reduced, miniaturization of the communications system can be implemented, and system complexity can be reduced; the first terahertz transceiver includes a terahertz transceiver that supports a fourth frequency band, the first beamforming network includes a beamforming network that supports the fourth frequency band, the fourth frequency band is a frequency band supported by the first terahertz transceiver, and the terahertz transceiver that supports the fourth frequency band, the beamforming network that supports the fourth frequency band, and the multi-band antenna array are sequentially connected; the second terahertz transceiver includes a terahertz transceiver that supports a fifth frequency band, the second beamforming network includes a beamforming network that supports the fifth frequency band, and the terahertz transceiver that supports the fifth frequency band, the beamforming network that supports the fifth frequency band, and the multi-band antenna array are sequentially connected; and the central controller is configured to control switching of types of data transmitted by the terahertz transceiver that supports the fourth frequency band and the terahertz transceiver that supports the fifth frequency band.

The central controller may control, based on an actual scenario, interchange of types of data transmitted by two terahertz transceivers that support different frequency bands, so as to implement function interchange between the APT subsystem and the communications subsystem. In this way, the two subsystems are no longer independent systems, and are integrated to form an entire system, and performance utilization of the two subsystems is more flexible.

In an optional implementation, the central controller is configured to: if a center frequency of the fourth frequency band is less than a center frequency of the fifth frequency band, determine whether tracking precision of the terahertz transceiver that supports the fourth frequency band is less than a specified tracking precision threshold, where the specified tracking precision threshold is minimum tracking precision that meets a communication requirement of the communications subsystem; and when the tracking precision of the terahertz transceiver that supports the fourth frequency band is less than the specified tracking precision threshold, switch the type of the data transmitted by the terahertz transceiver that supports the fourth frequency band from APT data to communication data, and switch the type of the data transmitted by the terahertz transceiver that supports the fifth frequency band from communication data to APT data.

In another optional implementation, the central controller is configured to: detect whether a second communication capacity of the second terahertz transceiver is less than a communication capacity threshold; when the second communication capacity is less than the communication capacity threshold, obtain a first communication capacity of the first terahertz transceiver; and when the first communication capacity is not less than the communication capacity threshold, switch the type of the data transmitted by the terahertz transceiver that supports the fourth frequency band from the APT data to the communication data, and switch the terahertz transceiver that supports the fifth frequency band to the first terahertz transceiver; or when the first communication capacity is less than the communication capacity threshold, compare the first communication capacity with the second communication capacity; and when the first communication capacity is greater than the second communication capacity, switch the type of the data transmitted by the terahertz transceiver that supports the fourth frequency band from the APT data to the communication data, and switch the type of the data transmitted by the terahertz transceiver that supports the fifth frequency band from the communication data to the APT data.

The foregoing two optional implementations may be further combined based on an actual situation.

According to a third aspect, a spacecraft is provided. Any spacecraft communications system according to the second aspect is disposed on the spacecraft.

According to a fourth aspect, a space communications system is provided. The space communications system includes at least two spacecrafts, and each spacecraft may be the spacecraft according to the third aspect.

According to a fifth aspect, a space communication method is provided. The method includes: acquiring a terahertz wave of another APT subsystem by using an APT subsystem; and after the terahertz wave of the another APT subsystem is acquired, pointing and tracking the another APT subsystem by using the terahertz wave.

Optionally, the method further includes: controlling, in an acquisition phase, the APT subsystem to perform terahertz wave beamforming processing by using a first beamwidth; and controlling, in a tracking phase and a pointing phase, the APT subsystem to perform terahertz wave beamforming processing by using a second beamwidth, where the second beamwidth is greater than the first beamwidth.

Optionally, the method further includes: controlling, in a coarse tracking phase, the APT subsystem to transmit a terahertz wave of a second frequency band, where the coarse tracking phase is a phase in which tracking precision of the APT subsystem meets an acquisition requirement after the acquisition phase of the APT subsystem starts, or the coarse tracking phase is a phase within preset duration after a start moment of the acquisition phase of the APT subsystem; and controlling, in a fine tracking phase, the APT subsystem to transmit a terahertz wave of a third frequency band, where the fine tracking phase is a phase that is adjacent to and located after the coarse tracking phase in a time sequence.

Further, the method includes: in a process in which the APT subsystem transmits a terahertz wave of each frequency band, controlling, in the acquisition phase, the APT subsystem to perform terahertz wave beamforming processing by using a third beamwidth; and controlling, in the tracking phase and the pointing phase, the APT subsystem to perform terahertz wave beamforming processing by using a fourth beamwidth, where the third beamwidth is greater than the fourth beamwidth.

Optionally, the method further includes: communicating, by using a communications subsystem, with another communications subsystem in a spacecraft communications system in which the another APT subsystem tracked by the APT subsystem is located.

Optionally, the method further includes: controlling switching between an APT subsystem that supports a fourth frequency band and a communications subsystem that supports a fifth frequency band. In other words, the APT subsystem after the switching supports the fifth frequency band, and the communications subsystem after the switching supports the fourth frequency band.

In an optional implementation, the controlling switching between an APT subsystem that supports a fourth frequency band and a communications subsystem that supports a fifth frequency band includes: if a center frequency of the fourth frequency band is less than a center frequency of the fifth frequency band, determining whether tracking precision of the APT subsystem that supports the fourth frequency band is less than a specified tracking precision threshold, where the specified tracking precision threshold is minimum tracking precision that meets a communication requirement of the communications subsystem; and when the tracking precision of the APT subsystem that supports the fourth frequency band is less than the specified tracking precision threshold, performing switching between the APT subsystem that supports the fourth frequency band and the communications subsystem that supports the fifth frequency band.

In another optional implementation, the controlling switching between an APT subsystem that supports a fourth frequency band and a communications subsystem that supports a fifth frequency band includes: detecting whether a second communication capacity of the communications subsystem is less than a communication capacity threshold; when the second communication capacity is less than the communication capacity threshold, obtaining a first communication capacity of the APT subsystem; and when the first communication capacity is not less than the communication capacity threshold, performing switching between the APT subsystem that supports the fourth frequency band and the communications subsystem that supports the fifth frequency band; or when the first communication capacity is less than the communication capacity threshold, comparing the first communication capacity with the second communication capacity; and when the first communication capacity is greater than the second communication capacity, performing switching between the APT subsystem that supports the fourth frequency band and the communications subsystem that supports the fifth frequency band.

The foregoing two optional implementations may be further combined based on a specific situation.

According to a sixth aspect, a control device is provided. The control device may include at least one module, and the at least one module may be configured to implement the data storage method according to the fifth aspect.

According to a seventh aspect, a control device is provided. The control device includes: a processor; and a memory for storing an executable instruction of the processor, where when running the executable instruction, the processor can implement the space communication method according to the fifth aspect.

According to an eighth aspect, a computer-readable storage medium is provided, where the computer-readable storage medium stores an instruction, and the computer-readable storage medium may be a non-volatile computer-readable storage medium. When the readable storage medium runs on a processing component, the processing component is enabled to perform the space communication method according to the first aspect.

According to a ninth aspect, a chip is provided, where the chip includes a programmable logic circuit and/or a program instruction, and when running, the chip is configured to implement the space communication method according to the fifth aspect.

In conclusion, in the APT subsystem and the spacecraft communications system provided in the embodiments of this application, because in the APT subsystem, the first controller controls the first terahertz transceiver to acquire, point, and track the terahertz wave by using the terahertz antenna array, and the terahertz wave is not susceptible to external vibration, pointing difficulty is relatively low, and energy efficiency is relatively high. Therefore, acquisition, pointing, and tracking efficiency of the APT subsystem is improved. Further, in the communications subsystem, because the second controller controls the second terahertz transceiver to perform communication by using the terahertz antenna array, and the terahertz wave has many advantages such as a narrow beam, good directivity, and relatively high energy efficiency, communication efficiency of the communications subsystem is improved. Further, the central controller in the spacecraft communications system may control, based on an actual scenario, interchange of types of data transmitted by two terahertz transceivers that support different frequency bands, so as to implement function interchange between the APT subsystem and the communications subsystem. In this way, the two subsystems are no longer independent systems, and are integrated to form an entire system, and performance utilization of the two subsystems is more flexible.

DETAILED DESCRIPTION OF ILLUSTRATIVE EMBODIMENTS

Figure 1:
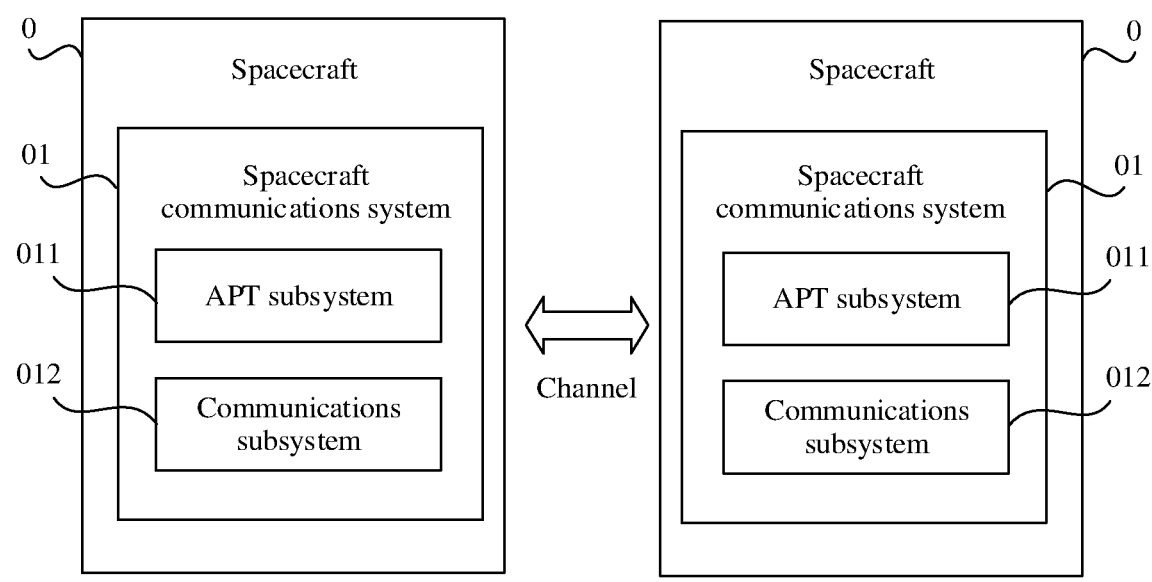
FIG. 1 is a schematic diagram of an implementation environment of a space communications system in a space communication method according to some embodiments of this application.

FIG. 1 is a schematic diagram of an implementation environment of a space communications system in a space communication method according to some embodiments of this application. The implementation environment may include: at least two spacecrafts 0, where a spacecraft communications system 01 is disposed on each spacecraft 0, and the spacecraft communications system 01 includes an APT subsystem 011 and a communications subsystem 012.

The spacecraft 0 may be a satellite, a spaceship, a space station, or another device running in space. In space, because a spacecraft usually rotates at a high speed, for example, at a speed of 7 kilometers per second, two spacecraft need to first perform an acquisition process, a pointing process, and a tracking process, to ensure that two high-speed rotating spacecraft can point at each other in real time, and then an effective communication connection can be established. The acquisition process includes: transmitting an electromagnetic wave (which is also referred to as a signal) outwards, so that another APT subsystem receives the electromagnetic wave; and receiving an electromagnetic wave and determining an incoming wave direction of the received electromagnetic wave. The pointing process includes: adjusting an antenna parameter (for example, an antenna direction) of the transmitted electromagnetic wave, to point at the incoming wave direction. The tracking process includes: continuously adjusting the antenna parameter of the transmitted electromagnetic wave, to point at the continuously changed incoming wave direction.

Figure 2:
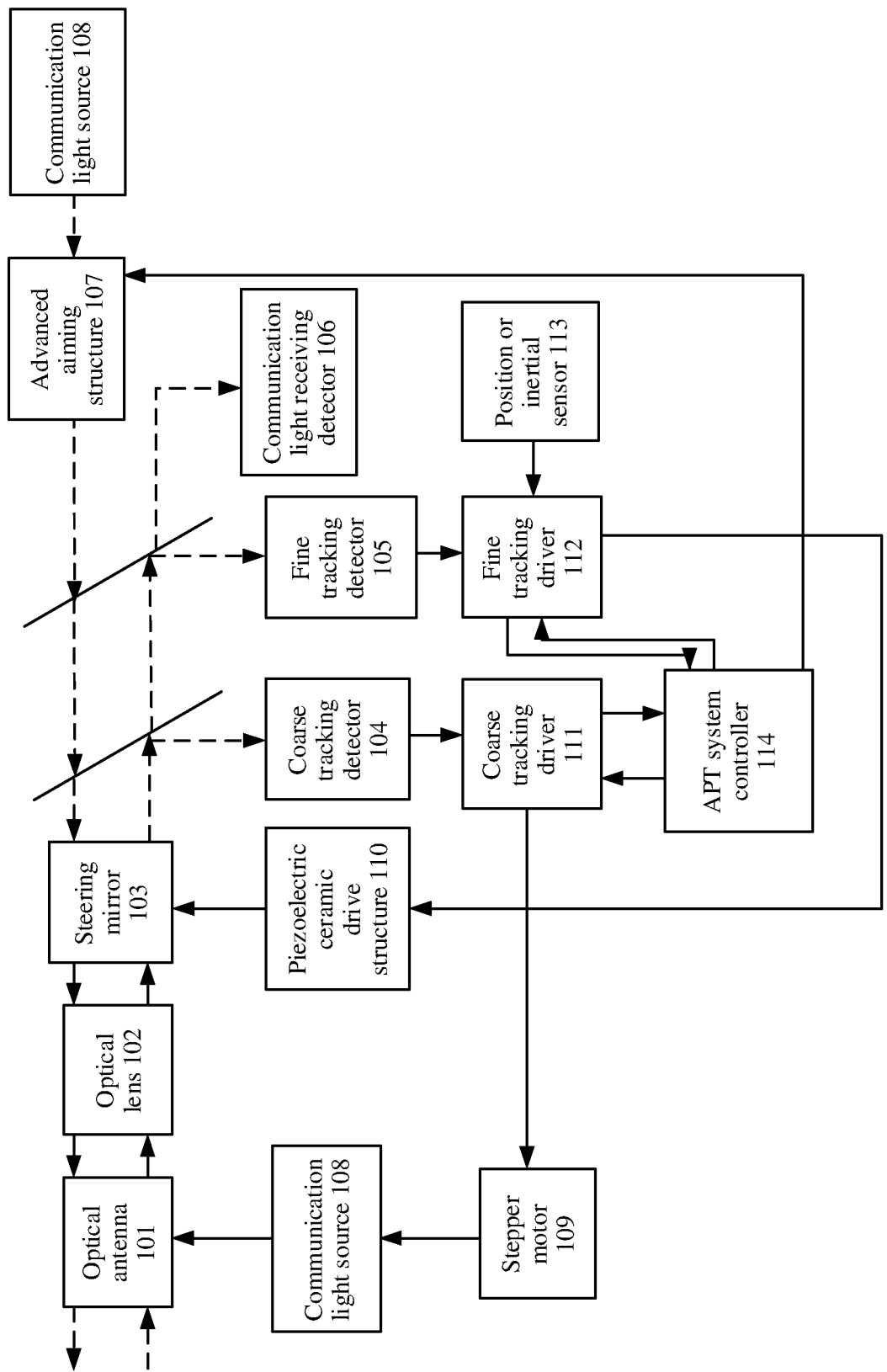
FIG. 2 is a schematic structural diagram of a conventional APT subsystem.

FIG. 2 is a schematic structural diagram of a conventional APT subsystem. The APT subsystem is an optical system. The optical system performs acquisition, pointing, and tracking actions by using a laser. The optical system includes an optical antenna 101, an optical lens 102, a steering mirror 103, a coarse tracking detector 104, a fine tracking detector 105, a communication light receiving detector 106, an advanced aiming structure 107, a communication light source 108, a stepper motor 109, a piezoelectric ceramic drive structure 110, a coarse tracking driver 111, a fine tracking driver 112, a position or inertial sensor 113, an APT system controller 114, and the like.

Spacecraft are usually far away from each other. Therefore, communication between spacecraft is long-distance communication. When the foregoing optical system performs communication by using a laser, because long-distance communication needs to be performed, a beamwidth of the laser beam is very small, and a beam angle (which is also referred to as a beam divergence angle) of the laser beam is also very small. In this way, long-distance pointing can be ensured. When the optical system is deployed on a spacecraft, a variation of the spacecraft up to dozens of prads (micro-radians) affects an optical antenna (for example, an optical transmit antenna or an optical receive antenna) in the optical system. Consequently, the optical antenna swings. When swinging becomes severe, the laser communication of the optical system is interrupted, and more often, a communication bit error rate of the optical system is increased, and communication quality is degraded. Because the laser is susceptible to external vibration, pointing difficulty of the laser is high, and energy efficiency of the laser serving as an information carrier is relatively low. Consequently, acquisition, pointing, and tracking efficiency of the foregoing APT subsystem is relatively low.

Figure 3:
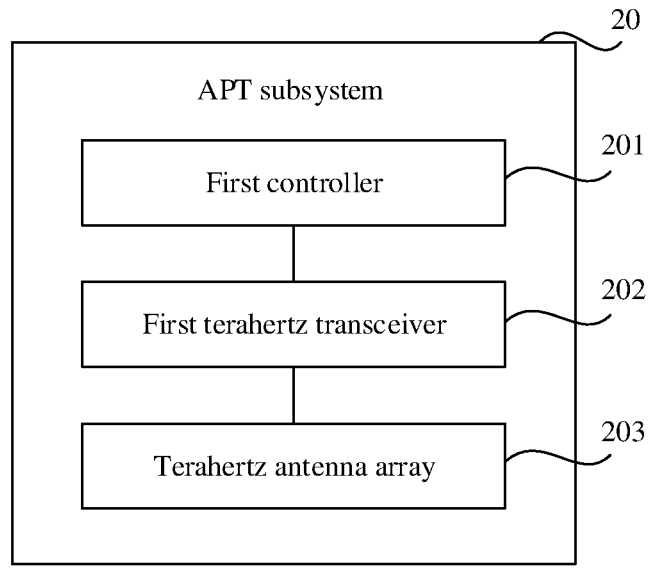
FIG. 3 is a schematic structural diagram of an APT subsystem according to an embodiment of this application.

In an embodiment of this application, two spacecraft may perform communication by using terahertz (Tera-Hertz, THz) technologies, and in particular, perform communication, to be specific, perform acquisition, pointing, and tracking processes, between APT subsystems by using the terahertz technologies. FIG. 3 is a schematic structural diagram of an APT subsystem 20 according to an embodiment of this application. The APT subsystem 20 includes: a first controller 201, a first terahertz transceiver 202, and a terahertz antenna array 203 that are sequentially connected, where the first terahertz transceiver 202 is configured to modulate and demodulate a terahertz wave; the terahertz antenna array 203 is configured to send and receive a terahertz wave; and the first controller 201 is configured to control the first terahertz transceiver to acquire, point, and track another APT subsystem by using the terahertz antenna array.

The terahertz wave is an electromagnetic wave whose frequency band is higher than that of a millimeter wave and lower than that of a light wave. The frequency band of the terahertz wave ranges from 100 GHz (gigahertz) to 10 THz (terahertz).

Compared with a laser used in a conventional optical system, the terahertz wave has the following advantages: (1) A photon energy of the terahertz wave is about 1/40 of that of visible light. The terahertz wave can carry more information than a laser with a same energy. Therefore, energy efficiency of the terahertz wave serving as an information carrier is higher. (2) The terahertz wave has a better capability of penetrating dust and smoke than the laser, and is not affected by an external environment. Therefore, the terahertz wave can be used for all-weather work. (3) A beam angle of the terahertz wave is greater than a beam angle of the laser. To be specific, a beamwidth of the terahertz wave is greater than a beamwidth of the laser, and a beam coverage area of the terahertz wave is larger. In this way, a terahertz transceiver can correctly receive an electromagnetic wave in a specific range. When the terahertz transceiver is used in an APT subsystem, acquisition and tracking requirements are relaxed, and a communication distance is extended.

In conclusion, in the APT subsystem provided in this embodiment of this application, because the first controller controls the first terahertz transceiver to acquire, point, and track the terahertz wave by using the terahertz antenna array, and the terahertz wave is not susceptible to external vibration, pointing difficulty is relatively low, and the energy efficiency is relatively high. Therefore, acquisition, pointing, and tracking efficiency of the APT subsystem is improved.

Figure 4:
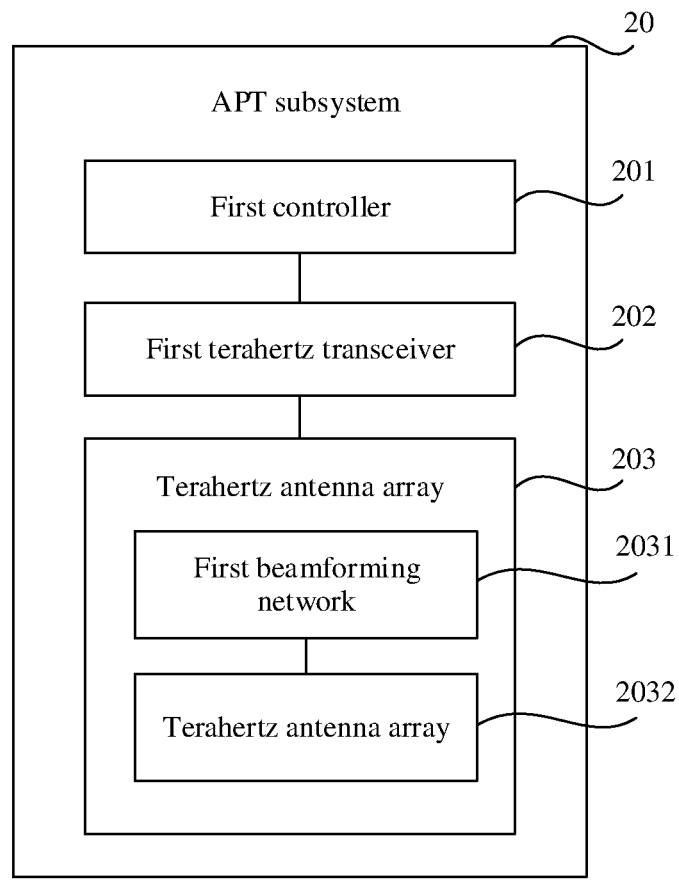
FIG. 4 is a schematic structural diagram of another APT subsystem according to an embodiment of this application.

FIG. 4 is a schematic structural diagram of another APT subsystem according to an embodiment of this application. Refer to FIG. 4. In an APT subsystem 20, a terahertz antenna array 203 is a beamforming antenna array, for example, a phased-array beamforming antenna array. The terahertz antenna array may control beamforming of an antenna by adjusting a phase. The beamforming antenna array may implement simultaneous or separately adjustment of an antenna direction and a beam bandwidth, to improve antenna parameter adjustment flexibility. The terahertz antenna array 203 includes a first beamforming network 2031 and an antenna array 2032 that are connected to each other, where a first terahertz transceiver 202 is configured to: modulate a to-be-sent first terahertz wave, and send a modulated first terahertz wave to the first beamforming network 2031, and the first beamforming network 2031 is configured to: perform beamforming processing on the modulated first terahertz wave, and send a processed first terahertz wave to the antenna array 2032; the antenna array 2032 is configured to send the processed first terahertz wave; the antenna array 2032 is further configured to: receive a second terahertz wave, and send the second terahertz wave to the first beamforming network 2031; the first beamforming network 2031 is further configured to: perform beamforming processing on the second terahertz wave to obtain a processed second terahertz wave, and send the processed second terahertz wave to the first terahertz transceiver; and the first terahertz transceiver 202 is further configured to perform demodulation processing on the processed second terahertz wave.

The antenna array may be further classified into a transmit antenna and a receive antenna based on functions.

Still refer to FIG. 2. In the optical system, in acquisition, pointing, and tracking processes, the stepper motor 109 needs to be used to adjust a direction of the optical antenna 101. In other words, an antenna direction is adjusted in a mechanical adjustment manner. A conventional APT subsystem may further perform communication by using a millimeter wave. The APT subsystem also needs to adjust an antenna direction in a mechanical adjustment manner. However, a relatively large mechanical error is easily introduced in the mechanical adjustment manner, and an adjustment speed is relatively low. Consequently, final antenna direction adjustment precision is relatively low. In this embodiment of this application, because the terahertz antenna array includes the first beamforming network and the antenna array, only a network parameter of the first beamforming network needs to be adjusted when the antenna direction is adjusted. In other words, the antenna direction is adjusted in an electronic adjustment manner, so that no mechanical error is introduced, and the adjustment is rapid. Compared with the conventional APT subsystem, the APT subsystem in this embodiment of this application improves the final antenna direction adjustment precision.

In this embodiment of this application, the APT subsystem may have a plurality of composition architectures. The following two composition architectures are used as examples for description in this embodiment of this application.

Figure 5:
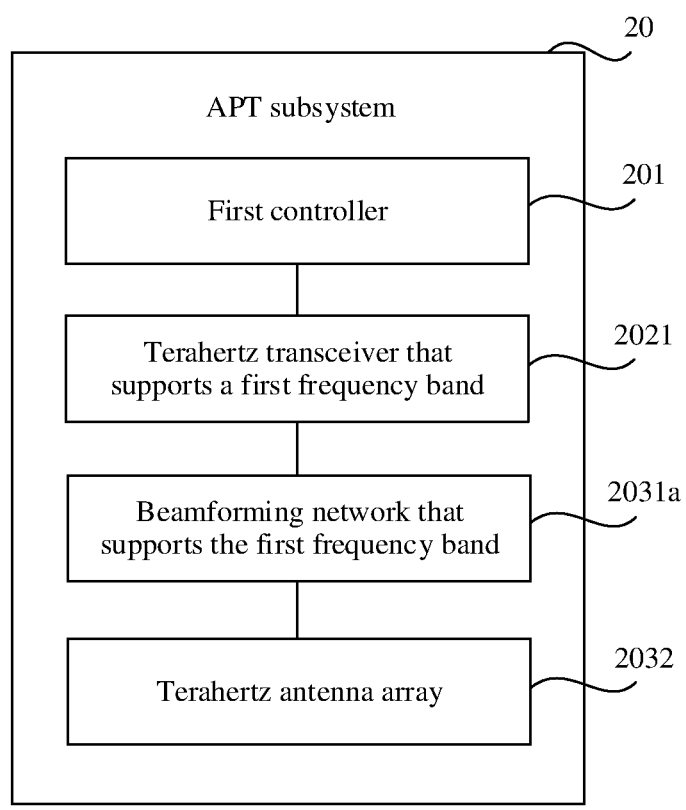
FIG. 5 is a schematic structural diagram of still another APT subsystem according to an embodiment of this application.

In a first composition architecture, referring to FIG. 5, in an APT subsystem 20, a first terahertz transceiver 202 includes a terahertz transceiver 2021 that supports a first frequency band, a first beamforming network 2031 includes a beamforming network 2031a that supports the first frequency band, and the terahertz transceiver 2021 that supports the first frequency band, the beamforming network 2031a that supports the first frequency band, and an antenna array 2032 are sequentially connected. The first frequency band may be any frequency band in a frequency band of a terahertz wave. In other words, the first frequency band ranges from 100 GHz to 10 THz.

Still refer to FIG. 2. In an optical system, an aperture of an optical antenna is a fixed aperture and cannot be adjusted. Therefore, a beamwidth of the optical antenna is a fixed beamwidth. Correspondingly, a beam angle is a fixed beam angle. When the optical system is used for acquisition, pointing, and tracking, only an antenna direction can be adjusted. Consequently, flexibility of acquisition, pointing, and tracking is relatively low.

In this embodiment of this application, a first controller 201 is further configured to control a beamforming network to adjust a beamwidth. For example, the first controller 201 is further configured to: control, in an acquisition phase, the beamforming network to perform terahertz wave beamforming processing by using a first beamwidth; and control, in a tracking phase and a pointing phase, the beamforming network to perform terahertz wave beamforming processing by using a second beamwidth, where the second beamwidth is greater than the first beamwidth.

In the acquisition phase (namely, a phase in which an acquisition action is performed), the first controller sets a beamwidth of the antenna array to a relatively wide width by using the beamforming network, and a corresponding beam angle is also relatively large. Therefore, a relatively large acquisition range and a relatively large electromagnetic wave transmission range can be ensured. This ensures that an electromagnetic wave of another APT subsystem can be quickly detected, or an electromagnetic wave transmitted by the APT subsystem can be quickly detected by another APT subsystem, so that an acquisition probability is improved. In the pointing phase (namely, a phase in which a pointing action is performed) and the tracking phase (namely, a phase in which a tracking action is performed), the first controller sets the beamwidth of the antenna array to a relatively narrow width by using the beamforming network, and a corresponding beam angle is also relatively small. In this way, accurate pointing and real-time tracking can be ensured. Therefore, in the APT subsystem provided in this embodiment of this application, adaptive beamwidths are used in different phases, to achieve coarse adjustment before fine adjustment of the beamwidth, so that effective acquisition, pointing, and tracking are implemented, and flexibility of acquisition, pointing, and tracking is improved.

For example, in the acquisition phase, the beamwidth of the antenna array may be set to 10° by using the beamforming network. In the pointing phase and the tracking phase, the beamwidth of the antenna array may be set to 3° by using the beamforming network. In this case, a beam is narrower, and tracking precision is higher.

It should be noted that the first controller 201 is further configured to: control, in the tracking phase and the pointing phase, the beamforming network to continuously decrease the beamwidth to perform terahertz wave beamforming processing until the beamwidth reaches a minimum beamwidth threshold, namely, a limit value supported by the beamforming network. In this case, tracking precision of the APT subsystem is the highest, and relatively good subsequent communication quality of a communications subsystem can be ensured. Certainly, in the tracking phase and the pointing phase, the first controller may alternatively be configured to control the beamforming network to continuously decrease the beamwidth to perform terahertz wave beamforming processing until the beamwidth reaches a specific beamwidth. The specific beamwidth may be flexibly determined based on a specific scenario. This is not limited in this embodiment of this application.

Figure 6:
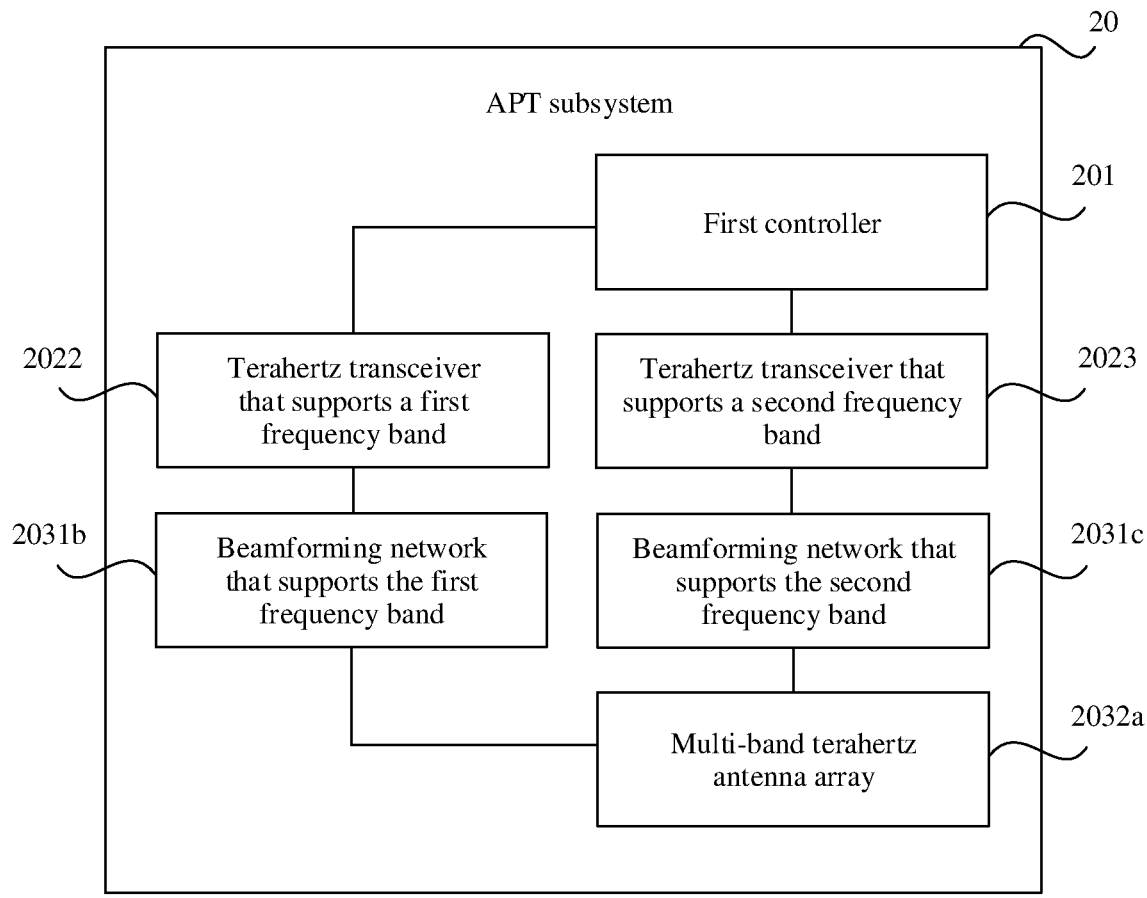
FIG. 6 is a schematic structural diagram of yet another APT subsystem according to an embodiment of this application.

In a second composition architecture, referring to FIG. 6, in an APT subsystem 20, a first terahertz transceiver 202 includes a terahertz transceiver 2022 that supports a second frequency band and a terahertz transceiver 2023 that supports a third frequency band. A first beamforming network 2031 includes a beamforming network 2031b that supports the second frequency band and a beamforming network 2031c that supports the third frequency band. An antenna array 2032 includes a set of multi-band antenna arrays 2032a. The terahertz transceiver 2022 that supports the second frequency band, the beamforming network 2031b that supports the second frequency band, and the multi-band antenna array 2032a are sequentially connected. The terahertz transceiver 2023 that supports the third frequency band, the beamforming network 2031c that supports the third frequency band, and the multi-band antenna array 2032a are sequentially connected. The second frequency band and the third frequency band may be any two different frequency bands in a frequency band of a terahertz wave. In other words, the second frequency band and the third frequency band both range from 100 GHz to 10 THz, and are different from each other. A center frequency of the second frequency band is less than a center frequency of the third frequency band. For example, the second frequency band ranges from 0.6 THz to 0.7 THz, and the third frequency band ranges from 2.1 THz to 2.3 THz.

In this embodiment of this application, a first controller 201 may be configured to control working switching between the terahertz transceivers that support different frequency bands, so that the two terahertz transceivers work in different phases. The control process includes: controlling, in a coarse tracking phase, working of the terahertz transceiver that supports the second frequency band, and controlling, in a fine tracking phase, working of the terahertz transceiver that supports the third frequency band, where when a communication requirement is not high or acquisition is just started (for example, when a connection of the APT subsystem has not been established), a lower frequency indicates a higher probability of implementing acquisition, but tracking precision is limited. The tracking precision is used to reflect precision of pointing from the APT subsystem to another APT subsystem. Higher tracking precision indicates a more stable transmission link of a communications subsystem and better quality of a signal transmitted by the communications subsystem. The tracking precision may be obtained through calculation based on one or more of parameters such as signal stability, a signal strength, and a signal error rate.

Therefore, the coarse tracking phase may be a phase in which tracking precision of the terahertz transceiver that supports the second frequency band meets an acquisition requirement after an acquisition phase of the terahertz transceiver that supports the second frequency band starts. In this case, the tracking precision is less than a coarse tracking precision threshold, and the coarse tracking precision threshold is a relatively low precision threshold. That the tracking precision is less than the coarse tracking precision threshold can ensure that the terahertz transceiver effectively acquires a signal. Alternatively, the coarse tracking phase is a phase with preset duration after a start moment of the acquisition phase of the terahertz transceiver that supports the second frequency band, that is, an acquisition start phase. For example, the preset duration is 5 seconds. The fine tracking phase is a phase that is adjacent to and located after the coarse tracking phase in a time sequence. In the fine tracking phase, relatively high tracking precision needs to be ensured.

An upper limit of the tracking precision of the APT subsystem varies with different frequencies. A lower frequency indicates lower tracking precision of the APT subsystem but easier acquisition and pointing. A higher frequency indicates higher tracking precision of the APT subsystem but more difficult acquisition and pointing. By using the foregoing control process, the first controller 201 can eliminate disadvantages of different frequencies, and uses a frequency advantage of each frequency band as much as possible, to implement a combination of coarse tracking and fine tracking, and improve flexibility of acquisition, pointing, and tracking.

Further, the first controller 201 is further configured to: control, in an acquisition phase of each terahertz transceiver in the terahertz transceiver 2022 that supports the second frequency band and the terahertz transceiver 2023 that supports the third frequency band, a beamforming network connected to the terahertz transceiver to perform terahertz wave beamforming processing by using a third beamwidth; and control, in a tracking phase and a pointing phase of each terahertz transceiver, the beamforming network connected to the terahertz transceiver to perform terahertz wave beamforming processing by using a fourth beamwidth, where the third beamwidth is greater than the fourth beamwidth.

In the acquisition phase of each terahertz transceiver, the first controller sets a beamwidth of the antenna array to a relatively wide width by using the beamforming network, and a corresponding beam angle is also relatively large. Therefore, a relatively large acquisition range and a relatively large terahertz wave transmission range can be ensured. This ensures that a terahertz wave of another APT subsystem can be quickly detected, or a terahertz wave transmitted by the APT subsystem can be quickly detected by another APT subsystem, so that an acquisition probability is improved. In the pointing phase and the tracking phase of each terahertz transceiver, the first controller sets the beamwidth of the antenna array to a relatively narrow width by using the beamforming network, and a corresponding beam angle is also relatively small. In this way, accurate pointing and real-time tracking can be ensured. Therefore, in the APT subsystem provided in this embodiment of this application, adaptive beamwidths are used in different phases of the terahertz transceivers that support different frequency bands, to achieve coarse adjustment before fine adjustment of the beamwidth, so that effective acquisition, pointing, and tracking are implemented, and flexibility of acquisition, pointing, and tracking is improved.

It should be noted that the foregoing APT subsystem may further have another composition architecture. For example, the first terahertz transceiver may further include at least three terahertz transceivers that support different frequency bands, the first beamforming network includes at least three beamforming networks that support different frequency bands, the at least three terahertz transceivers are in a one-to-one correspondence with the at least three beamforming networks, and the first controller may control working switching between the terahertz transceivers that support different frequency bands. In this way, the at least three terahertz transceivers work in different phases, and a frequency band in which the APT subsystem works can be flexibly adjusted. For a switching process, refer to the switching process in the foregoing second composition architecture. Details are not described in this embodiment of this application again.

In conclusion, because the APT subsystem provided in this embodiment of this application uses the terahertz wave for acquisition, pointing, and tracking, and the terahertz wave is not susceptible to external vibration, pointing difficulty is relatively low, and energy efficiency is relatively high. Therefore, acquisition, pointing, and tracking efficiency of the APT subsystem is improved, and communication stability is ensured.

Figure 7:
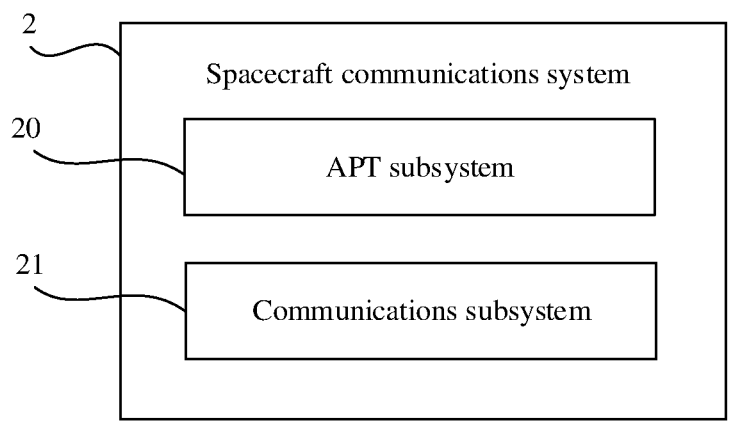
FIG. 7 is a schematic structural diagram of a spacecraft communications system according to an embodiment of this application.

FIG. 7 is a schematic structural diagram of a spacecraft communications system 2 according to an embodiment of this application. The communications system 2 of the spacecraft includes: any APT subsystem 20 provided in the foregoing embodiments of this application; and a communications subsystem 21, where the communications subsystem 21 is configured to communicate with another communications subsystem in a spacecraft communications system in which another APT subsystem tracked by the APT subsystem is located.

In conclusion, in the spacecraft communications system provided in this embodiment of this application, because the APT subsystem uses a terahertz wave for acquisition, pointing, and tracking, and the terahertz wave is not susceptible to external vibration, pointing difficulty is relatively low, and energy efficiency is relatively high. Therefore, acquisition, pointing, and tracking efficiency of the APT subsystem is improved.

Figure 8:
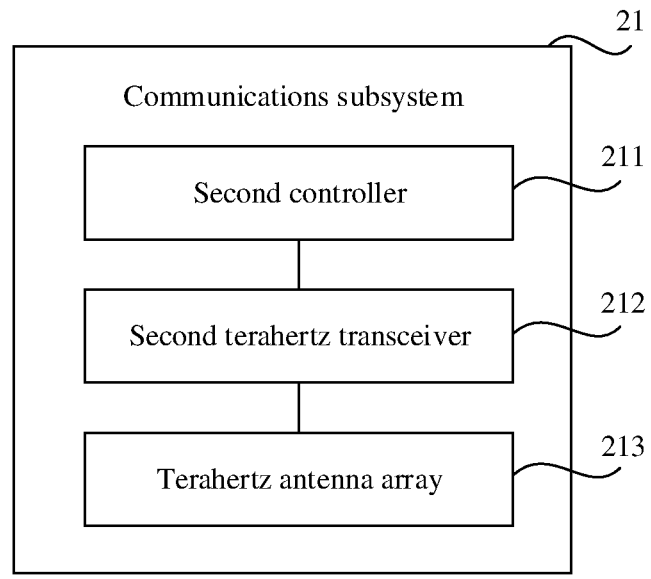
FIG. 8 is a schematic structural diagram of a communications subsystem according to an embodiment of this application.

FIG. 8 is a schematic structural diagram of a communications subsystem 21 according to an embodiment of this application. The communications subsystem 21 includes: a second controller 211, a second terahertz transceiver 212, and a terahertz antenna array 213 that are sequentially connected, where the second terahertz transceiver 212 is configured to modulate and demodulate a terahertz wave; the terahertz antenna array 213 is configured to send and receive a terahertz wave; and the second controller 211 is configured to control the second terahertz transceiver 212 to communicate with another communications subsystem by using the terahertz antenna array 213.

A conventional communications subsystem is a microwave communications system in which microwave communication is used. Compared with a microwave used in a conventional microwave communications system, the terahertz wave has the following advantages: (1) A terahertz communication transmission capacity is larger. A terahertz transmission bandwidth is far greater than a microwave bandwidth of hundreds of megabytes, and can be used to implement communication at a Gb/s (gibibyte/s) level, thereby meeting a high bandwidth requirement in future communication. (2) The terahertz wave has a narrower beam, and better directivity, and can be used to detect a smaller target, and perform more precise positioning. (3) The terahertz wave can be completely absorbed by the atmosphere and cannot reach the surface of the earth. Therefore, the terahertz wave has better confidentiality and an anti-interference capability. (4) Because the terahertz wave has a relatively short wavelength, an antenna size can be smaller and other system structures can be simpler and more cost-effective with the same function. Therefore, in the communications subsystem provided in this embodiment of this application, because the second controller controls the second terahertz transceiver to perform communication by using the terahertz antenna array, and the terahertz wave has many advantages such as a narrow beam, good directivity, and relatively high energy efficiency, communication efficiency of the communications subsystem is improved.

Figure 9:
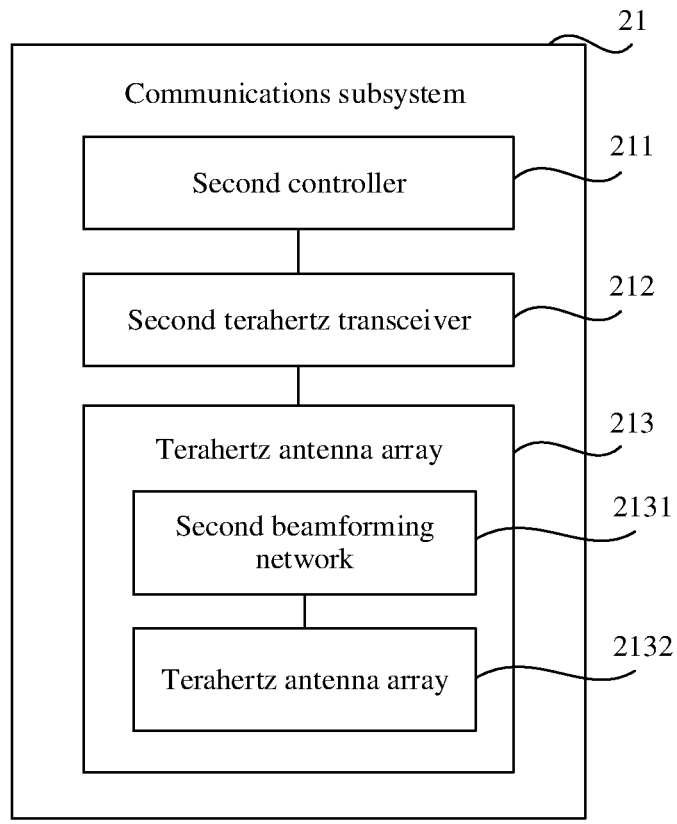
FIG. 9 is a schematic structural diagram of a communications subsystem according to an embodiment of this application.

FIG. 9 is a schematic structural diagram of a communications subsystem 21 according to an embodiment of this application. In the communications subsystem 21, a terahertz antenna array 213 is a beamforming antenna array, for example, a phased array beamforming antenna array, and the terahertz antenna array 213 may control beamforming of an antenna in a phase adjustment manner. The terahertz antenna array 213 includes a second beamforming network 2131 and an antenna array 2132 that are connected to each other, where a second terahertz transceiver 212 is configured to modulate a to-be-sent third terahertz wave, and send a modulated third terahertz wave to the second beamforming network 2131, and the second beamforming network 2131 is configured to: perform beamforming processing on the modulated third terahertz wave, and send a processed third terahertz wave to the antenna array 2132; the antenna array 2132 is configured to send the processed third terahertz wave; the antenna array 2132 is further configured to: receive a fourth terahertz wave, and send the fourth terahertz wave to the second beamforming network 2131; the second beamforming network 2131 is further configured to: perform beamforming processing on the fourth terahertz wave to obtain a processed fourth terahertz wave, and send the processed fourth terahertz wave to the second terahertz transceiver 212; and the second terahertz transceiver 212 is further configured to perform demodulation processing on the processed fourth terahertz wave.

For a communications subsystem, a beamforming antenna array may be used to receive and send a terahertz wave in a beamforming manner, to implement precise point-to-point communication. This can effectively reduce interference to another communications subsystem, and ensure high gain and high directivity of a transmit antenna and a receive antenna without using any mechanical structure, so that a system structure is simple and easy to implement.

A conventional aircraft communications system includes an APT subsystem and a communications subsystem. The APT subsystem and the communications subsystem are independent of each other, and a communications interface is disposed between the APT subsystem and the communications subsystem. After acquiring a signal of another APT subsystem and pointing the another APT subsystem, the APT subsystem may send a communication trigger signal to the communications subsystem by using the communications interface, and the communications subsystem establishes a communication connection to another communications subsystem based on the communication trigger signal. The another communications subsystem and the another APT subsystem are located in a communications system of a same aircraft. Because the APT subsystem and the communications subsystem are independent of each other, performance of the APT subsystem and the communications subsystem may be unevenly distributed in some cases. For example, performance of one subsystem is excessive, causing a waste, and performance of the other subsystem is insufficient, affecting communication efficiency. Consequently, flexibility of performance utilization of the two subsystems is relatively low.

Figure 10:
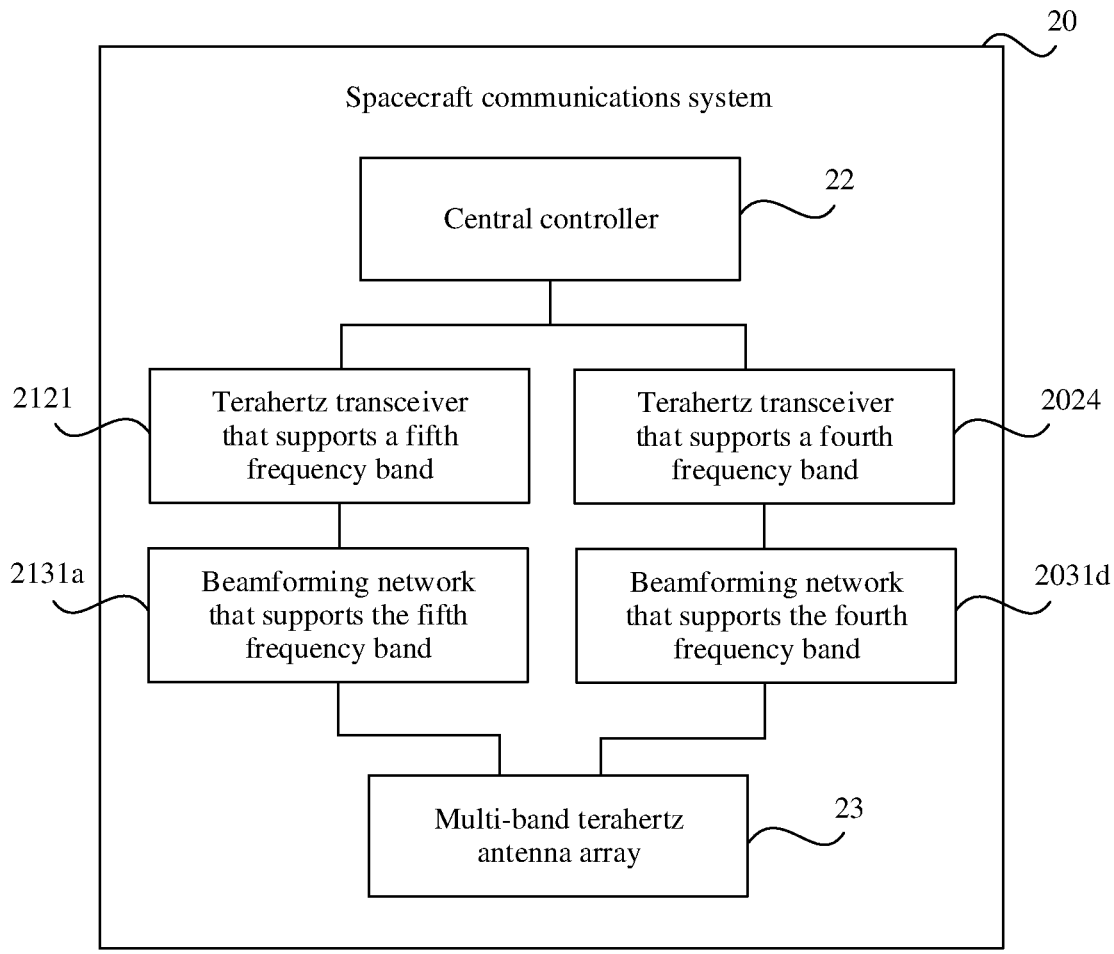
FIG. 10 is a schematic structural diagram of a spacecraft communications system according to an embodiment of this application.

FIG. 10 is a schematic structural diagram of a spacecraft communications system 2 according to an embodiment of this application. The communications system 2 further includes: a central controller 22. In an optional implementation, the central controller 22 is separately connected to a first controller and a second controller. In another optional implementation, a first controller and a second controller are integrated into the central controller 22. In FIG. 10, an example in which the first controller and the second controller are integrated into the central controller is used for description.

Optionally, an APT subsystem and a communications subsystem share a set of multi-band antenna arrays. In this way, an overall volume and weight of the spacecraft communications system can be reduced, miniaturization of the communications system can be implemented, and system complexity can be reduced.

Still refer to FIG. 10. A first terahertz transceiver 202 includes a terahertz transceiver 2024 that supports a fourth frequency band, the first beamforming network 2031 includes a beamforming network 2031$d$ that supports the fourth frequency band, the fourth frequency band is a frequency band supported by the first terahertz transceiver, and the terahertz transceiver 2024 that supports the fourth frequency band, the beamforming network 2031$d$ that supports the fourth frequency band, and a multi-band antenna array 23 are sequentially connected. For example, when a structure of the APT subsystem is shown in FIG. 5, the terahertz transceiver that supports the fourth frequency band is the terahertz transceiver that supports the first frequency band. That is, the terahertz transceiver that supports the fourth frequency band and the terahertz transceiver that supports the first frequency band are a same transceiver. When a structure of the APT subsystem is shown in FIG. 6, the terahertz transceiver that supports the fourth frequency band is one of the terahertz transceiver that supports the second frequency band and the terahertz transceiver that supports the third frequency band. The central processing unit may select, according to a specified rule from the terahertz transceiver that supports the second frequency band and the terahertz transceiver that supports the third frequency band, the terahertz transceiver as the terahertz transceiver that supports the fourth frequency band. The specified rule may be to select a terahertz transceiver that supports a highest frequency band, or to select a terahertz transceiver that supports the lowest frequency band, or to randomly select a terahertz transceiver.

A second terahertz transceiver 212 includes a terahertz transceiver 2121 that supports a fifth frequency band, a second beamforming network 2131 includes a beamforming network 2131a that supports the fifth frequency band, and the terahertz transceiver 2121 that supports the fifth frequency band, the beamforming network 2131a that supports the fifth frequency band, and the multi-band antenna array 23 are sequentially connected. The fourth frequency band and the fifth frequency band may be any two different frequency bands in frequency bands of a terahertz wave. In other words, both the fourth frequency band and the fifth frequency band range from 100 GHz to 10 THz, and are different from each other. Optionally, a center frequency of the fourth frequency band is less than a center frequency of the fifth frequency band. For example, the fourth frequency band ranges from 0.6 THz to 0.7 THz, and the fifth frequency band ranges from 2.1 THz to 2.3 THz.

The central controller 22 is configured to control switching of types of data transmitted by the terahertz transceiver 2024 that supports the fourth frequency band and the terahertz transceiver 2121 that supports the fifth frequency band.

In this embodiment of this application, before a switching action is performed, the APT subsystem includes the terahertz transceiver that supports the fourth frequency band, so that data transmitted by the terahertz transceiver that supports the fourth frequency band is APT data; the communications subsystem includes the terahertz transceiver that supports the fifth frequency band, so that data transmitted by the terahertz transceiver that supports the fifth frequency band is communication data. The switching action is data type switching. To be specific, the type of the data transmitted by the terahertz transceiver that supports the fourth frequency band is switched from the APT data to the communication data, and the type of the data transmitted by the terahertz transceiver that supports the fifth frequency band is switched from the communication data to the APT data. Therefore, the types of the data transmitted by the two terahertz transceivers that support different frequency bands are interchanged. In this way, it is equivalent to switching the terahertz transceiver that supports the fourth frequency band to the second terahertz transceiver, and switching the terahertz transceiver that supports the fifth frequency band to the first terahertz transceiver. The central controller may control, based on an actual scenario, interchange of the types of the data transmitted by the two terahertz transceivers that support different frequency bands, so as to implement function interchange between the APT subsystem and the communications subsystem. In this way, the two subsystems are no longer independent systems, and are integrated to form an entire system, and performance utilization of the two subsystems is more flexible. It should be noted that, the foregoing APT data refers to data required in acquisition, pointing, and tracking processes, for example, including one or more of posture information of the spacecraft, position coordinates of the spacecraft, a moving speed of the spacecraft, and a signal required for establishing an APT connection, where the signal required for establishing the APT connection may be a connection establishment request signal or a connection establishment response signal. The communication data refers to data that actually needs to be transmitted between two spacecrafts, for example, commercial data, control data, or user data. Content of the communication data may be picture data, video data, or the like.

Optionally, the central controller may control, based on the actual scenario, interchange of the types of the data transmitted by the two terahertz transceivers that support different frequency bands, for example, control, based on tracking precision and/or a communication capacity, the interchange of the types of the data transmitted by the two terahertz transceivers that support different frequency bands. The communication capacity is used to reflect a maximum information rate at which a channel can be transmitted without an error, and may represent a maximum amount of information that can be transmitted per second or per channel symbol. The communication capacity may be calculated by using at least one of a signal-to-noise ratio, a throughput rate, and a channel quality parameter.

In an optional implementation, a process in which the central controller controls, based on the tracking precision, the interchange of the types of the data transmitted by the two terahertz transceivers that support different frequency bands includes the following steps.

Step X1: If the center frequency of the fourth frequency band is less than the center frequency of the fifth frequency band, determine whether tracking precision of the terahertz transceiver that supports the fourth frequency band is less than a specified tracking precision threshold.

The specified tracking precision threshold is minimum tracking precision that meets a communication requirement of the communications subsystem, that is, a communication lower limit that meets the communication requirement of the communications subsystem. The communications subsystem can effectively transmit the communication data only when the tracking precision of the terahertz transceiver that supports the fourth frequency band is not less than the specified tracking precision threshold.

Step X2: When the tracking precision of the terahertz transceiver that supports the fourth frequency band is less than the specified tracking precision threshold, switch the type of the data transmitted by the terahertz transceiver that supports the fourth frequency band from the APT data to the communication data, and switch the type of the data transmitted by the terahertz transceiver that supports the fifth frequency band from the communication data to the APT data.

When the tracking precision of the terahertz transceiver that supports the fourth frequency band is less than the specified tracking precision threshold, it indicates that the terahertz transceiver that supports the fourth frequency band cannot be ensured to point and track another APT subsystem. In this case, controlling the interchange of the types of the data transmitted by the two terahertz transceivers that support different frequency bands may enable a terahertz transceiver that supports a high frequency band, namely, the terahertz transceiver that supports the fifth frequency band, to perform pointing and tracking, thereby improving precision of pointing and tracking, and increasing a probability of effective communication of the communications subsystem.

Step X3: When the tracking precision of the terahertz transceiver that supports the fourth frequency band is not less than the specified tracking precision threshold, the types of the data transmitted by the terahertz transceiver that supports the fourth frequency band and the terahertz transceiver that supports the fifth frequency band remain unchanged.

When the tracking precision of the terahertz transceiver that supports the fourth frequency band is not less than the specified tracking precision threshold, it indicates that the terahertz transceiver that supports the fourth frequency band can be ensured to point and track another APT subsystem. In this case, there is no need to interchange the types of the data transmitted by the two terahertz transceivers that support different frequency bands.

In another optional implementation, a process in which the central controller controls, based on the communication capacity, the interchange of the types of the data transmitted by the two terahertz transceivers that support different frequency bands includes the following steps.

Step Y1: Detect whether a second communication capacity of the second terahertz transceiver is less than a communication capacity threshold.

Step Y2: When the second communication capacity is less than the communication capacity threshold, obtain a first communication capacity of the first terahertz transceiver.

Step Y3: When the first communication capacity is not less than the communication capacity threshold, switch the type of the data transmitted by the terahertz transceiver that supports the fourth frequency band from the APT data to the communication data, and switch the type of the data transmitted by the terahertz transceiver that supports the fifth frequency band from the communication data to the APT data.

When the second communication capacity is less than the communication capacity threshold, and the first communication capacity is not less than the communication capacity threshold, it indicates that the terahertz transceiver that supports the fourth frequency band cannot meet a communication requirement while the terahertz transceiver that supports the fifth frequency band can meet the communication requirement. In this case, controlling the interchange of the types of the data transmitted by the two terahertz transceivers that support different frequency bands may enable the terahertz transceiver that meets the communication requirement to perform communication, so that communication efficiency is improved.

Step Y4: When the first communication capacity is less than the communication capacity threshold, compare the first communication capacity with the second communication capacity.

Step Y5: When the first communication capacity is greater than the second communication capacity, switch the type of the data transmitted by the terahertz transceiver that supports the fourth frequency band from the APT data to the communication data, and switch the type of the data transmitted by the terahertz transceiver that supports the fifth frequency band from the communication data to the APT data.

When the second communication capacity is less than the communication capacity threshold, and the first communication capacity is less than the communication capacity threshold, but the first communication capacity is greater than the second communication capacity, it indicates that the terahertz transceivers that support the fourth frequency band and the fifth frequency band cannot meet the communication requirement, but the terahertz transceiver that supports the fifth frequency band has a higher communication capacity than the terahertz transceiver that supports the fourth frequency band. In this case, controlling the interchange of the types of the data transmitted by the two terahertz transceivers that support different frequency bands may enable the terahertz transceiver that relatively meets the communication requirement to perform communication, so that communication efficiency is improved.

Certainly, when the first communication capacity is not greater than the second communication capacity, the types of the data transmitted by the two terahertz transceivers that support different frequency bands do not need to be interchanged.

The foregoing two optional implementations may be further combined based on an actual situation. For example, when a communication capacity requirement is not high (for example, a communication capacity needs to be greater than a relatively low first communication capacity threshold), but acquisition, pointing, and tracking are all relatively difficult (for example, when vibration of the spacecraft is relatively large), if the center frequency of the fourth frequency band is less than the center frequency of the fifth frequency band, the central controller may use the terahertz transceiver that supports the fourth frequency band to perform an acquisition process, so as to increase an acquisition probability, and then switches to the terahertz transceiver that supports the fifth frequency band to perform a pointing process and a tracking process, so as to improve tracking accuracy, and use the terahertz transceiver that supports the fourth frequency for communication. In an entire process, after acquisition is completed, a switching process is performed.

For another example, when a communication capacity requirement is high (for example, a communication capacity needs to be greater than a relatively high second communication capacity threshold, and the second communication capacity threshold is greater than the foregoing first communication capacity threshold), and acquisition, pointing, and tracking are not difficult, if the center frequency of the fourth frequency band is less than the center frequency of the fifth frequency band, the central controller may use the terahertz transceiver that supports the fourth frequency to perform an acquisition process, a pointing process, and a tracking process, and use the terahertz transceiver that supports the fifth frequency for communication. No switching is required in an entire process.

For another example, when a communication capacity requirement is high (for example, a communication capacity needs to be greater than a relatively high second communication capacity threshold, and the second communication capacity threshold is greater than the foregoing first communication capacity threshold), and acquisition, pointing, and tracking are relatively difficult, if the center frequency of the fourth frequency band is less than the center frequency of the fifth frequency band, the central controller may use the terahertz transceiver that supports the fourth frequency to perform an acquisition process, so as to increase an acquisition probability, and then may switch to the terahertz transceiver that supports the fifth frequency band to perform a pointing process and a tracking process, so as to improve tracking precision, and use the terahertz transceiver that supports the fourth frequency for communication. If the communication capacity of the terahertz transceiver that supports the fourth frequency cannot meet the requirement, the central controller switches to the terahertz transceiver that supports the fourth frequency to perform the tracking process, and uses the terahertz transceiver that supports the fifth frequency for communication. In an entire process, after acquisition is completed, a switching process is performed, and in a communication process, a switching process is performed again.

In this embodiment of this application, a correspondence between a switching condition and a switching rule may be configured in the central processing unit. When a specified parameter meets a switching condition in the correspondence, the correspondence is queried to obtain a target switching rule corresponding to the switching condition. The target switching rule is used to control interchange of the types of the data transmitted by the two terahertz transceivers that support different frequency bands. Details are not described in this embodiment of this application. The specified parameter may be a frequency band that is supported by each terahertz transceiver and/or a communication capacity of each terahertz transceiver. The foregoing switching rule is a rule formulated in advance based on an actual scenario.

It should be noted that the foregoing switching process may be a hardware switching process, or may be a software process. If the switching process is the hardware switching process, a switch module may be disposed on a link between the central controller and the terahertz transceiver that supports the fourth frequency band and the terahertz transceiver that supports the fifth frequency band, the switch module is configured to switch a transmission path of the APT data and the communication data that are transmitted by the central controller. If the switching process is the software process, after the central controller runs software to interchange the APT data and the communication data that need to be transmitted, the interchanged data is transmitted to the terahertz transceiver that supports the fourth frequency band and the terahertz transceiver that supports the fifth frequency band. In other words, the data originally transmitted to the terahertz transceiver that supports the fourth frequency band is transmitted to the terahertz transceiver that supports the fifth frequency band, and the data originally transmitted to the terahertz transceiver that supports the fifth frequency band is transmitted to the terahertz transceiver that supports the fourth frequency band.

The apparatuses provided in the embodiments of this application may be used in the following method. For a working procedure and a working principle of each unit in the embodiments of this application, refer to descriptions in the following embodiments.

Figure 11:
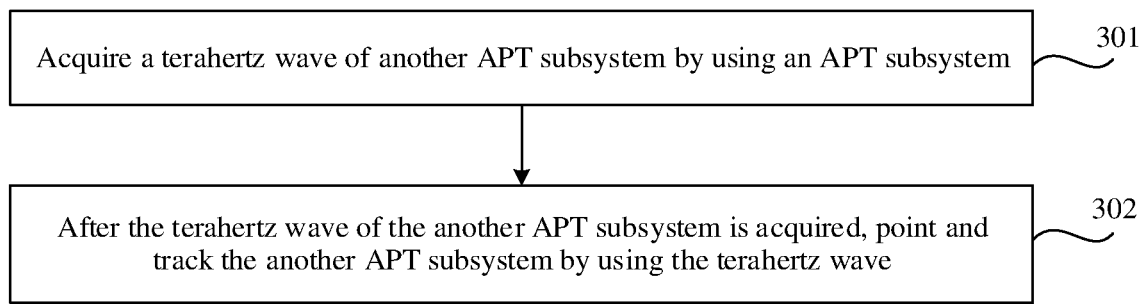
FIG. 11 is a schematic flowchart of a space communication method according to an embodiment of this application.

An embodiment of this application provides a space communication method, applied to the foregoing spacecraft, for example, the foregoing APT subsystem or the spacecraft communications system. As shown in FIG. 11, the method includes at least the following steps.

Step 301: Acquire a terahertz wave of another APT subsystem by using an APT subsystem.

Step 302: After the terahertz wave of the another APT subsystem is acquired, point and track the another APT subsystem by using the terahertz wave.

In conclusion, in the space communication method provided in this embodiment of this application, because the APT subsystem acquires, points, and tracks the terahertz wave of the another APT subsystem, and the terahertz wave is not susceptible to external vibration, pointing difficulty is relatively low, and energy efficiency is relatively high. Therefore, acquisition, pointing, and tracking efficiency of the APT subsystem is improved.

Figure 12:
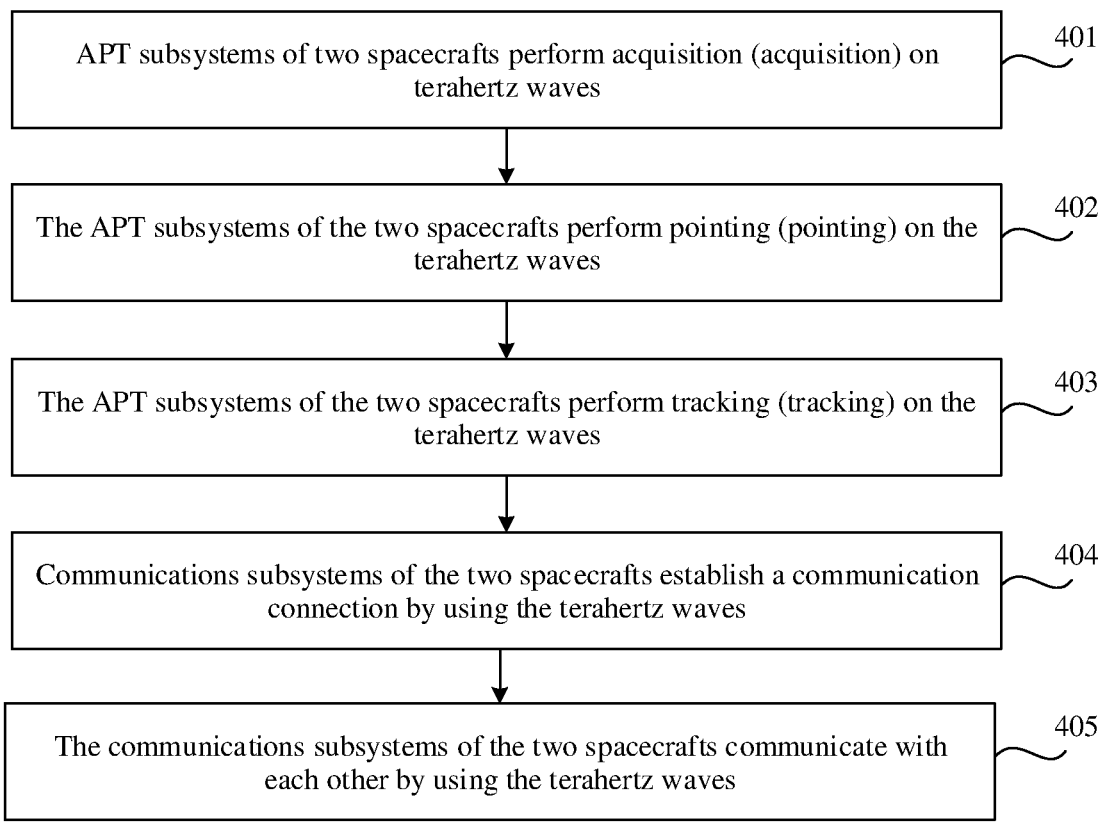
FIG. 12 is a schematic flowchart of another space communication method according to an embodiment of this application.

An embodiment of this application provides a space communication method, applied to an implementation environment shown in FIG. 1. The implementation environment may include at least two spacecraft. When two spacecraft in the at least two spacecraft need to communicate, and both the two spacecraft are satellites, the two spacecraft may be synchronous satellites or non-synchronous satellites, and communication between the two spacecraft may be referred to as inter-satellite communication. It is assumed that the two spacecraft are a first spacecraft and a second spacecraft, and each spacecraft uses terahertz technologies for communication. In other words, each spacecraft may be any spacecraft provided in the foregoing embodiments of this application, and structures of communications systems of the two spacecrafts may be the same. In this way, as shown in FIG. 12, the method includes the following steps.

Step 401: APT subsystems of the two spacecraft perform acquisition (acquisition) on terahertz waves.

The APT subsystem of the first spacecraft performs an acquisition process. The process includes: acquiring a terahertz wave of another APT subsystem by using the APT subsystem. For example, the process includes: continuously performing regular space scanning and searching within a beamwidth range (namely, a detection surface), to detect a terahertz wave from the APT subsystem of the second spacecraft. In addition, the APT subsystem of the first spacecraft continuously transmits, within the beamwidth range, terahertz waves outwards.

Similarly, the APT subsystem of the second spacecraft performs an acquisition process. The process includes: acquiring a terahertz wave of the other APT subsystem by using the APT subsystem. For example, the process includes: continuously performing regular space scanning and searching within a beamwidth range, to detect a terahertz wave from the APT subsystem of the first spacecraft. In addition, the APT subsystem of the second spacecraft continuously transmits, within the beamwidth range, terahertz waves outwards.

Once an APT subsystem of one of the two spacecraft detects a connection establishment request signal transmitted by an APT subsystem of the other spacecraft in a terahertz wave form (in other words, a signal strength of a received terahertz wave is greater than a specified signal strength threshold), a location of a receive antenna may be locked to determine an incoming wave direction of the terahertz wave, and the APT subsystem of the spacecraft sends a connection establishment response signal in a terahertz wave form against the incoming wave direction of the terahertz wave. After the APT subsystem of the other spacecraft receives the connection establishment response signal in the terahertz wave form, the two APT subsystems enter an initial pointing state, and the acquisition process ends.

The first spacecraft is used as an example. If the APT subsystem in the first spacecraft is the APT subsystem shown in FIG. 3, in the APT subsystem, a first controller controls a first terahertz transceiver to transmit a terahertz wave by using a terahertz antenna array, to acquire, point, and track the terahertz wave transmitted by the other APT subsystem.

Further, if the APT subsystem in the first spacecraft is the APT subsystem shown in any one of FIG. 4 to FIG. 6, when the APT subsystem transmits a terahertz wave, the first terahertz transceiver modulates to-be-sent first terahertz wave, and sends a modulated first terahertz wave to a first beamforming network. The first beamforming network performs beamforming processing on the modulated first terahertz wave, and sends a processed first terahertz wave to an antenna array. The antenna array transmits the processed first terahertz wave. When the APT subsystem receives a terahertz wave, the antenna array receives a second terahertz wave, and sends the second terahertz wave to the first beamforming network. The first beamforming network performs beamforming processing on the second terahertz wave to obtain a processed second terahertz wave, and sends the processed second terahertz wave to the first terahertz transceiver. The first terahertz transceiver performs demodulation processing on the processed second terahertz wave.

Step 402: The APT subsystems of the two spacecraft perform pointing on the terahertz waves.

The APT subsystems of the two spacecraft each perform a pointing process. The pointing process includes: adjusting an antenna parameter of an APT subsystem, so that the antenna parameter meets a specified condition, and the pointing process is completed. The antenna parameter may include at least one of an antenna direction and a beamwidth, and the specified condition may be that a beam direction of a received terahertz beam is coaxial with an antenna direction of the receive antenna, or that an angle between a beam direction of a received terahertz beam and an antenna direction of the receive antenna is less than a specified angle threshold.

Step 403: The APT subsystems of the two spacecraft perform tracking on the terahertz waves.

The APT subsystems of the two spacecraft repeat the pointing process. The process of repeating the pointing process is a tracking process. In this way, the two APT subsystems can maintain an optimal signal receiving state. Each APT subsystem adjusts the antenna parameter in real time based on various factors such as a change of an incident direction of the terahertz wave and a variation of the subsystem. In this way, the APT subsystem performs pointing when meeting a specific precision requirement, and is in a dynamic balance state.

In step 402 and step 403, the first spacecraft is used as an example. If the APT subsystem in the first spacecraft is the APT subsystem shown in any one of FIG. 3 to FIG. 6, in the APT subsystem, after acquiring a terahertz wave of the other APT subsystem, the first controller controls the first terahertz transceiver to point and track, by using the terahertz antenna array, the other APT subsystem by using the terahertz wave. In the pointing process and the tracking process, for a process in which an APT subsystem transmits a terahertz wave, refer to the foregoing step 401. Details are not described in this embodiment of this application.

It should be noted that, the first spacecraft is used as an example, and the foregoing space communication method may further include: The first spacecraft may control, in an acquisition phase described in step 401, the APT subsystem to perform terahertz wave beamforming processing by using a first beamwidth. The first spacecraft may control, in a tracking phase and a pointing phase described in step 402 and step 403, the APT subsystem to perform terahertz wave beamforming processing by using a second beamwidth, where the second beamwidth is greater than the first beamwidth.

For example, if the APT subsystem in the first spacecraft is the APT subsystem shown in FIG. 5, the first controller controls, in the acquisition phase described in step 401, a beamforming network to perform terahertz wave beamforming processing by using the first beamwidth. The first controller controls, in the tracking phase and the pointing phase described in step 402 and step 403, the beamforming network to perform terahertz wave beamforming processing by using the second beamwidth, where the second beam width is greater than the first beam width.

The first spacecraft is used as an example, and the foregoing space communication method further includes: The first spacecraft controls, in a coarse tracking phase, an APT subsystem to transmit a terahertz wave of a second frequency band, where the coarse tracking phase is a phase in which tracking precision of the APT subsystem meets an acquisition requirement after the acquisition phase of the APT subsystem starts, or the coarse tracking phase is a phase whose start moment is less than preset duration after a start moment of the acquisition phase of the APT subsystem; and controls, in a fine tracking phase, the APT subsystem to transmit a terahertz wave of a third frequency band, where the fine tracking phase is a phase that is adjacent to and located after the coarse tracking phase in a time sequence.

Further, in a process in which the APT subsystem transmits a terahertz wave of each frequency band, the first spacecraft may control, in the acquisition phase, the APT subsystem to perform terahertz wave beamforming processing by using a third beamwidth; and control, in the tracking phase and the pointing phase, the APT subsystem to perform terahertz wave beamforming processing by using a fourth beamwidth, where the third beamwidth is greater than the fourth beamwidth.

For example, if the APT subsystem in the first spacecraft is the APT subsystem shown in FIG. 6, the first controller controls, in a coarse tracking phase, control a terahertz transceiver that supports a second frequency band to work, where the coarse tracking phase is a phase in which tracking precision of the terahertz transceiver that supports the second frequency band meets an acquisition requirement after an acquisition phase of the terahertz transceiver that supports the second frequency band starts, or the coarse tracking phase is a phase whose start moment is less than preset duration after a start moment of an acquisition phase of the terahertz transceiver that supports the second frequency band; and controls, in a fine tracking phase, a terahertz transceiver that supports a third frequency band to work, where the fine tracking phase is a phase that is adjacent to and located after the coarse tracking phase in a time sequence.

The first controller controls, in the acquisition phase, described in step 401, of each terahertz transceiver, a beamforming network connected to the terahertz transceiver to perform terahertz wave beamforming processing by using a third beamwidth; and controls, in the tracking phase and the pointing phase, described in step 402 and step 403, of each terahertz transceiver, a beamforming network connected to the terahertz transceiver to perform terahertz wave beamforming processing by using a fourth beamwidth, where the third beamwidth is greater than the fourth beamwidth.

It should be noted that, in the foregoing step 401 to step 403, data transmitted by the two APT subsystems by using the terahertz waves is APT data.

Step 404: Communications subsystems of the two spacecrafts establish a communication connection by using the terahertz waves.

In the two spacecrafts, each spacecraft may communicate, by using a communications subsystem, with another communications subsystem in a spacecraft communications system in which another APT subsystem tracked by an APT subsystem is located. For example, a communications subsystem of one spacecraft sends a connection establishment request in a terahertz wave form to a communications subsystem of the other spacecraft, the communications subsystem of the other spacecraft sends a connection establishment response in a terahertz wave form to the communications subsystem of the spacecraft. After the communications subsystem of the spacecraft receives the connection establishment response, the communications connection is established.

Step 405: The communications subsystems of the two spacecraft communicate with each other by using the terahertz waves.

The communications subsystems of the two spacecraft communicate through terahertz waves based on the established communication connection. Communication data is transmitted between the two spacecraft.

The first spacecraft is used as an example. In a communication process, the APT subsystem obtains APT data of the APT subsystem of the second spacecraft. The APT data reflects a change of a location and a channel environment between spacecraft, the APT subsystem may transmit the APT data to the communications subsystem, and the communications subsystem dynamically adjusts a beamwidth and an antenna direction based on feedback of the APT subsystem, to obtain an optimal communication rate.

For example, in the first spacecraft, if the APT subsystem includes a first controller, and the communications subsystem includes a second controller, after obtaining APT data sent by the first terahertz transceiver, the first controller transmits the APT data to the second controller, and the second controller controls the second terahertz transceiver and a corresponding terahertz antenna array. If the first controller and the second controller are integrated into a central controller, the central controller can implement functions of the first controller and the second controller. After obtaining the APT data sent by the first terahertz transceiver, the central controller directly controls the second terahertz transceiver and the corresponding terahertz antenna array.

It should be noted that, before step 401, the APT subsystems of the two spacecraft may further perform initial positioning on an antenna. The initial positioning on the antenna refers to initial setting of an antenna parameter of an APT subsystem, so that the antenna parameter meets a specific condition, for example, so that a beamwidth is within a specified width range, and an antenna direction is within a specified direction range. For example, the APT subsystem may perform initial positioning of an antenna based on satellite ephemeris calculation, global positioning system (Global Positioning System, GPS) system positioning, deep space network sounding and positioning, telemetry and remote control of a terrestrial station, or the like. In this way, initial aiming errors of the APT subsystems of the two spacecrafts can be limited within a specific range, to ensure precision of subsequent acquisition, pointing, and tracking.

Optionally, after step 403, when the terahertz wave of the other APT subsystem disappears on a detection surface of the APT subsystem, for example, due to external interference or another case, a link between the APT subsystems of the two spacecrafts is damaged, and the two APT subsystems may repeatedly perform the foregoing step 401 to step 403, to re-establish a link connection, so as to ensure a normal and stable communication link of the communications subsystems.

Further, the first spacecraft is used as an example, and in a process of performing step 401 to step 405, the first spacecraft may further control switching between an APT subsystem that supports a fourth frequency band and a communications subsystem that supports a fifth frequency band. In other words, the APT subsystem after the switching supports the fifth frequency band, and the fourth subsystem after the switching supports the fourth frequency band.

For example, the first spacecraft detects whether a specified parameter meets a switching condition in a correspondence between the switching condition and a switching rule, where the specified parameter may be a frequency band supported by each terahertz transceiver, and/or a communication capacity of each terahertz transceiver, and the foregoing switching rule is a rule formulated in advance based on an actual scenario. When the specified parameter meets a specific switching condition in the correspondence, the correspondence is queried to obtain a target switching rule corresponding to the specific switching condition, and the target switching rule is used to control the interchange of types of data transmitted by the two terahertz transceivers that support different frequency bands.

In an optional implementation, the first spacecraft controls a switching process between the APT subsystem that supports the fourth frequency band and the communications subsystem that supports the fifth frequency band, and the method includes: if a center frequency of the fourth frequency band is smaller than a center frequency of the fifth frequency band, determining whether tracking precision of the APT subsystem that supports the fourth frequency band is smaller than a specified tracking precision threshold, where the specified tracking precision threshold is minimum tracking precision that meets a communication requirement of the communications subsystem; and when the tracking precision of the APT subsystem that supports the fourth frequency band is less than the specified tracking precision threshold, switching between the APT subsystem that supports the fourth frequency band and the communications subsystem that supports the fifth frequency band.

In another optional implementation, the first spacecraft controls a switching process between the APT subsystem that supports the fourth frequency band and the communications subsystem that supports the fifth frequency band, and the method includes: detecting whether a second communication capacity of the communications subsystem is smaller than a communication capacity threshold; when the second communication capacity is less than the communication capacity threshold, obtaining a first communication capacity of the APT subsystem; when the first communication capacity is not less than the communication capacity threshold, switching between the APT subsystem that supports the fourth frequency band and the communications subsystem that supports the fifth frequency band; when the first communication capacity is less than the communication capacity threshold, comparing the first communication capacity with the second communication capacity; and when the first communication capacity is greater than the second communication capacity, performing the switching between the APT subsystem that supports the fourth frequency band and the communications subsystem that supports the fifth frequency band. The foregoing two optional implementations may be further combined based on a specific situation.

It should be noted that, if a communications system in the first spacecraft is the communications system shown in FIG. 10, the space communication method further includes: controlling, based on an actual scenario, the interchange of the types of the data transmitted by the two terahertz transceivers that support different frequency bands, for example, control, based on the tracking precision and/or the communication capacity, the interchange of the types of the data transmitted by the two terahertz transceivers that support different frequency bands. For a process of controlling, based on the tracking precision, the interchange of the types of the data transmitted by the two terahertz transceivers that support different frequency bands, refer to the foregoing step X1 to step X3. For a process of controlling, based on the communication capacity, the interchange of the types of the data transmitted by the two terahertz transceivers that support different frequency bands, refer to the foregoing step Y1 to step Y5.

It should be noted that in the foregoing steps of this application, the first spacecraft is mainly used as an example to describe the space communication method. For a space communication method performed by the second spacecraft, refer to the space communication method performed by the first spacecraft. Details are not described in this embodiment of this application again. A sequence of the steps of the space communication method provided in the embodiments of this application can be properly adjusted, and the steps can be correspondingly added or deleted based on a situation. Any method that can be easily figured out by a person skilled in the art without departing from a technical scope disclosed in this application shall fall within the protection scope of this application, and therefore details are not described again.

It may be clearly understood by a person skilled in the art that, for convenience and brevity of description, for a specific working process of the foregoing subsystem, system, and apparatus, refer to a corresponding process in the foregoing apparatus embodiments. Details are not described herein again.

In conclusion, in the space communication method provided in this embodiment of this application, because the APT subsystem acquires, points, and tracks the terahertz wave of the other APT subsystem, and the terahertz wave is not susceptible to external vibration, pointing difficulty is relatively low, and energy efficiency is relatively high. Therefore, acquisition, pointing, and tracking efficiency of the APT subsystem is improved.

Figure 13:
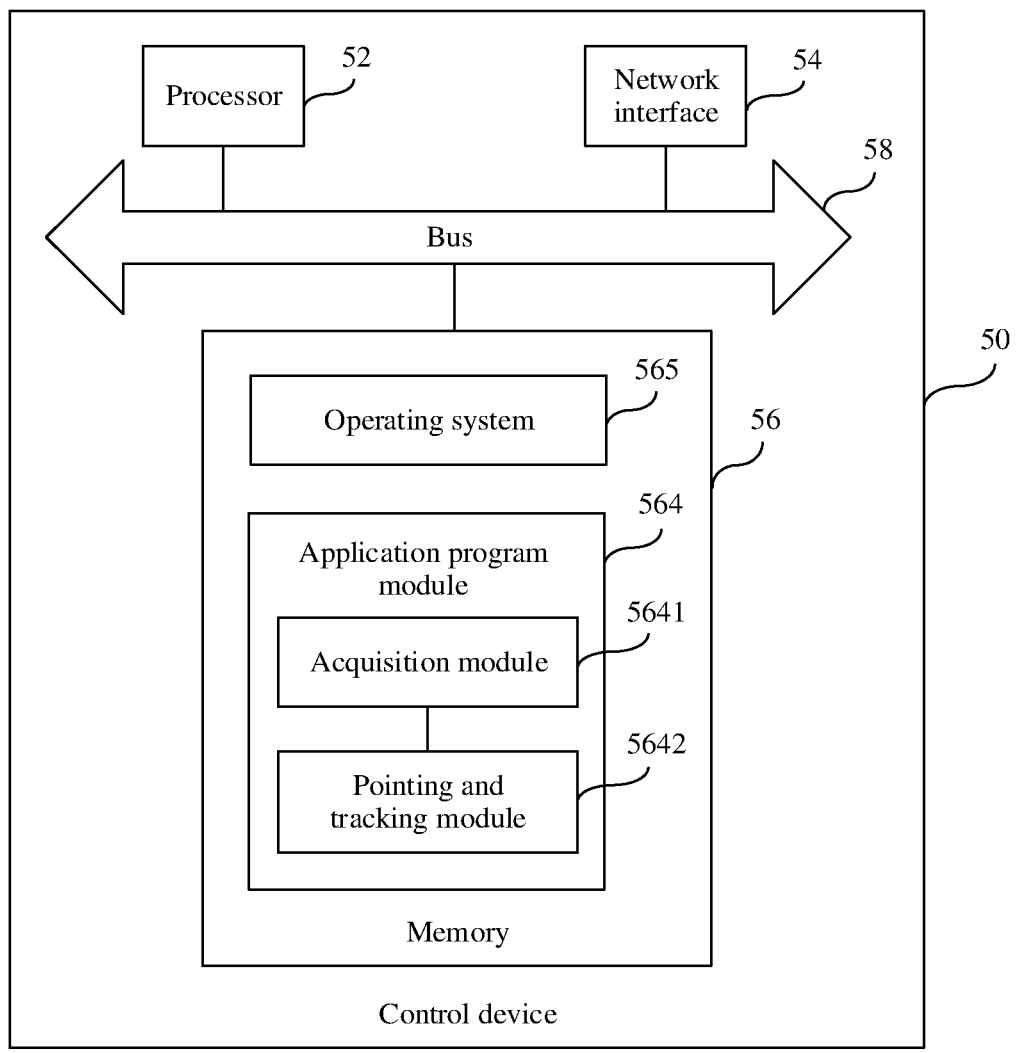
FIG. 13 is a schematic structural diagram of a control device according to an embodiment of this application.

FIG. 13 is a schematic structural diagram of a control device 50 according to an example embodiment of this application. The control device may implement functions of the foregoing central controller, or implement functions of the foregoing central controller, first controller, and second controller. For example, the control device 50 may include a processor 52 and network interfaces 54.

The processor 52 includes one or more processing cores. The processor 52 runs a software program and a module, to perform various function applications and data processing, so as to implement one or more steps in the method performed by one spacecraft in the foregoing space communication method.

There may be a plurality of network interfaces 54. The network interfaces 54 is configured to communicate with another storage device or network device.

Optionally, the control device 50 further includes components such as a memory 56 and a bus 58. The memory 56 and the network interfaces 54 are separately connected to the processor 52 by using the bus 58.

The memory 56 may be configured to store a software program and a module. The memory 56 may store an operating system 565 and an application program module 564 required for at least one function. The operating system 565 may be an operating system, for example, a real-time operating system (RTX), Linux, Unix, Windows, or OS X.

For example, the application program module 564 may include: an acquisition module 5641, configured to acquire a terahertz wave of another APT subsystem by using an APT subsystem; a pointing and tracking module 5642, configured to: after the terahertz wave of the another APT subsystem is acquired, point and track the another APT subsystem by using the terahertz wave.

"First", "second", or the like mentioned in this application does not indicate any order, quantity, or importance, but is used only for distinguishing between different components. "Including" or the like means that a component or an object that appears before the word covers a component or an object that appears after the word and is equivalent to the component or the object, and does not exclude another component or object. "Connection", "link", or the like is not limited to a physical or mechanical connection, but may include an electrical connection, and the connection may be direct or indirect.

The term "and/or" in this application describes only an association relationship for describing associated objects and represents that three relationships may exist. For example, A and/or B may represent the following three cases: Only A exists, both A and B exist, and only B exists. In addition, the character "/" in this specification usually indicates an "or" relationship between the associated objects.

The term "at least one of A and B" in this application is only an association relationship for describing associated objects, and represents that three relationships may exist. For example, at least one of A and B may represent the following three cases: Only A exists, both A and B exist, and only B exists.

It should be understood that this application is not limited to the accurate structures that are described in the foregoing and that are shown in the accompanying drawings, and modifications and changes may be made without departing from the scope of this application. The scope of this application is limited only by the appended claims.

What is claimed is:

1. An acquisition, pointing, and tracking (APT) subsystem, comprising:
   a first controller;
   a first terahertz transceiver system, configured to modulate and demodulate terahertz waves, wherein the first terahertz transceiver system comprises a first terahertz transceiver that supports a second frequency band and a second terahertz transceiver that supports a third frequency band; and
   a terahertz antenna array system, comprising a first beamforming network and an antenna array connected to each other;
   wherein the first controller, the first terahertz transceiver system, and the terahertz antenna array system are sequentially connected, and wherein the terahertz antenna array system is configured to send and receive terahertz waves;
   wherein the first controller is configured to control the first terahertz transceiver system to acquire, point, and track another APT subsystem using the terahertz antenna array system;
   wherein the first beamforming network comprises a beamforming network that supports the second frequency band and a beamforming network that supports the third frequency band, the antenna array comprises a set of multi-band antenna arrays;
   wherein the first terahertz transceiver that supports the second frequency band, the beamforming network that supports the second frequency band, and the set of multi-band antenna arrays are sequentially connected;
   wherein the second terahertz transceiver that supports the third frequency band, the beamforming network that supports the third frequency band, and the set of multi-band antenna arrays are sequentially connected;
   wherein a center frequency of the second frequency band is less than a center frequency of the third frequency band; and
   wherein the first controller is configured to:

control, in a coarse tracking phase, working of the first terahertz transceiver that supports the second frequency band, wherein the coarse tracking phase is a phase in which tracking precision of the first terahertz transceiver that supports the second frequency band meets an acquisition requirement after an acquisition phase of the first terahertz transceiver that supports the second frequency band starts, or the coarse tracking phase is a phase within preset duration after a start moment of the acquisition phase of the first terahertz transceiver that supports the second frequency band; and control, in a fine tracking phase, working of the second terahertz transceiver that supports the third frequency band, wherein the fine tracking phase is a phase that is adjacent to and located after the coarse tracking phase in a time sequence.

2. The APT subsystem according to claim 1,
wherein the first terahertz transceiver system is configured to:
  modulate a to-be-sent first terahertz wave, to generate a modulated first terahertz wave; and
  send the modulated first terahertz wave to the first beamforming network;
wherein the first beamforming network is configured to:
  perform beamforming processing on the modulated first terahertz wave, to generate a processed first terahertz wave; and
  send the processed first terahertz wave to the antenna array;
wherein the antenna array is configured to send the processed first terahertz wave;
wherein the antenna array is further configured to:
  receive a second terahertz wave; and
  send the second terahertz wave to the first beamforming network;
wherein the first beamforming network is further configured to:
  perform beamforming processing on the second terahertz wave, to obtain a processed second terahertz wave; and
  send the processed second terahertz wave to the first terahertz transceiver system; and
wherein the first terahertz transceiver system is further configured to perform demodulation processing on the processed second terahertz wave.

3. The APT subsystem according to claim 2, wherein:
the first terahertz transceiver system comprises a third terahertz transceiver that supports a first frequency band, the first beamforming network further comprises a beamforming network that supports the first frequency band, and the third terahertz transceiver that supports the first frequency band, the beamforming network that supports the first frequency band, and the antenna array are sequentially connected; and
the first controller is further configured to:
  control, in an acquisition phase, the beamforming network that supports the first frequency band to perform terahertz wave beamforming processing by using a first beamwidth; and
  control, in a tracking phase and a pointing phase, the beamforming network that supports the first frequency band to perform terahertz wave beamforming processing using a second beamwidth, wherein the second beamwidth is greater than the first beamwidth.

4. The APT subsystem according to claim 1, wherein the first controller is configured to:
  control, in an acquisition phase of each terahertz transceiver of the APT subsystem, a beamforming network connected to the corresponding terahertz transceiver to perform terahertz wave beamforming processing using a third beamwidth; and
  control, in a tracking phase and a pointing phase of each terahertz transceiver of the APT subsystem, the beamforming network connected to the corresponding terahertz transceiver to perform terahertz wave beamforming processing using a fourth beamwidth, wherein the third beamwidth is greater than the fourth beamwidth.

5. A spacecraft communications system, comprising:
a first acquisition, pointing, and tracking (APT) subsystem, the first APT subsystem comprising:
  first controller;
  a first terahertz transceiver system, configured to modulate and demodulate terahertz waves, wherein the first terahertz transceiver system comprises a first terahertz transceiver that supports a second frequency band and a second terahertz transceiver that supports a third frequency band; and
  a first terahertz antenna array system, wherein the first terahertz antenna array system comprises a first beamforming network and an antenna array, and wherein the first beamforming network and the antenna array are connected to each other, wherein the first controller, the first terahertz transceiver system, and the first terahertz antenna array system are sequentially connected, and wherein the first terahertz antenna array system is configured to send and receive terahertz waves; and
a communications subsystem, wherein the communications subsystem is configured to communicate with another communications subsystem in which a second APT subsystem is located; and
wherein the first controller is configured to control the first terahertz transceiver system to acquire, point, and track the second APT subsystem using the first terahertz antenna array system and the communications subsystem;
wherein the first beamforming network comprises a beamforming network that supports the second frequency band and a beamforming network that supports the third frequency band, the antenna array comprises a set of multi-band antenna arrays;
wherein the first terahertz transceiver that supports the second frequency band, the beamforming network that supports the second frequency band, and the set of multi-band antenna arrays are sequentially connected;
wherein the second terahertz transceiver that supports the third frequency band, the beamforming network that supports the third frequency band, and the set of multi-band antenna arrays are sequentially connected;
wherein a center frequency of the second frequency band is less than a center frequency of the third frequency band; and
wherein the first controller is configured to:
  control, in a coarse tracking phase, working of the first terahertz transceiver that supports the second frequency band, wherein the coarse tracking phase is a phase in which tracking precision of the first terahertz transceiver that supports the second frequency band meets an acquisition requirement after an acquisition phase of the first terahertz transceiver that supports the second frequency band starts, or the coarse tracking phase is a phase within preset duration after a start moment of the acquisition phase of the first terahertz transceiver that supports the second frequency band; and control, in a fine tracking phase, working of the second terahertz transceiver that supports the third frequency band, wherein the fine tracking phase is a phase that is adjacent to and located after the coarse tracking phase in a time sequence.

6. The spacecraft communications system according to claim 5, wherein the communications subsystem comprises:
a second controller;
a second terahertz transceiver system, configured to modulate and demodulate terahertz waves; and
a second terahertz antenna array system, wherein the second controller, the second terahertz transceiver system, and the second terahertz antenna array system are sequentially connected, and wherein the second terahertz antenna array system is configured to send and receive terahertz waves; and
wherein the second controller is configured to control the second terahertz transceiver system to communicate with the another communications subsystem using the second terahertz antenna array system.

7. The spacecraft communications system according to claim 6, wherein:
the second terahertz antenna array system comprises a second beamforming network and a second antenna array, wherein the second beamforming network and the second antenna array are connected to each other;
the second terahertz transceiver system is configured to:
modulate a to-be-sent third terahertz wave, to form a modulated third terahertz wave; and
send the modulated third terahertz wave to the second beamforming network;
wherein the second beamforming network is configured to:
perform beamforming processing on the modulated third terahertz wave, to form a processed third terahertz wave; and
send the processed third terahertz wave to the second antenna array;
the second antenna array is configured to send the processed third terahertz wave;
the second antenna array is further configured to:
receive a fourth terahertz wave; and
send the fourth terahertz wave to the second beamforming network;
the second beamforming network is further configured to:
perform beamforming processing on the fourth terahertz wave to obtain a processed fourth terahertz wave; and
send the processed fourth terahertz wave to the second terahertz transceiver system; and
the second terahertz transceiver system is further configured to perform demodulation processing on the processed fourth terahertz wave.

8. The spacecraft communications system according to claim 7, further comprising:
a central controller, wherein the central controller is separately connected to the first controller and the second controller, or the first controller and the second controller are integrated into the central controller;
wherein the APT subsystem and the communications subsystem share a set of multi-band antenna arrays;

wherein the first terahertz transceiver system further comprises a third terahertz transceiver that supports a fourth frequency band;
wherein the first beamforming network further comprises a beamforming network that supports the fourth frequency band;
wherein the third terahertz transceiver that supports the fourth frequency band, the beamforming network that supports the fourth frequency band, and the set of multi-band antenna arrays are sequentially connected;
wherein the second terahertz transceiver system comprises a fourth terahertz transceiver that supports a fifth frequency band, the second beamforming network comprises a beamforming network that supports the fifth frequency band, and wherein the fourth terahertz transceiver that supports the fifth frequency band, the beamforming network that supports the fifth frequency band, and the set of multi-band antenna arrays are sequentially connected; and
wherein the central controller is configured to control switching of types of data transmitted by the third terahertz transceiver that supports the fourth frequency band and the fourth terahertz transceiver that supports the fifth frequency band.

9. The spacecraft communications system according to claim 8, wherein the central controller is configured to:
when a center frequency of the fourth frequency band is less than a center frequency of the fifth frequency band, determine whether a tracking precision of the third terahertz transceiver that supports the fourth frequency band is less than a specified tracking precision threshold, wherein the specified tracking precision threshold is a minimum tracking precision that meets a communication requirement of the communications subsystem; and
when it is determined the tracking precision of the third terahertz transceiver that supports the fourth frequency band is less than the specified tracking precision threshold, switch the type of the data transmitted by the third terahertz transceiver that supports the fourth frequency band from APT data to communication data, and switch the type of the data transmitted by the fourth terahertz transceiver that supports the fifth frequency band from communication data to APT data.

10. The spacecraft communications system according to claim 8, wherein the central controller is configured to:
detect whether a second communication capacity of the second terahertz transceiver system is less than a communication capacity threshold;
when it is detected that the second communication capacity is less than the communication capacity threshold, obtain a first communication capacity of the first terahertz transceiver system; and
when the first communication capacity is not less than the communication capacity threshold, switch the type of the data transmitted by the third terahertz transceiver that supports the fourth frequency band from APT data to communication data, and switch the type of the data transmitted by the fourth terahertz transceiver that supports the fifth frequency band from the communication data to the APT data; or
when the first communication capacity is less than the communication capacity threshold, compare the first communication capacity with the second communication capacity; and
when the first communication capacity is greater than the second communication capacity, switch the type of the data transmitted by the third terahertz transceiver that supports the fourth frequency band from the APT data to the communication data, and switch the type of the data transmitted by the fourth terahertz transceiver that supports the fifth frequency band from the communication data to the APT data.

11. The spacecraft communications system according to claim 5,
wherein the first terahertz transceiver system is configured to:
modulate a to-be-sent first terahertz wave, to generate a modulated first terahertz wave; and
send the modulated first terahertz wave to the first beamforming network;
wherein the first beamforming network is configured to:
perform beamforming processing on the modulated first terahertz wave, to generate a processed first terahertz wave; and
send the processed first terahertz wave to the antenna array;
wherein the antenna array is configured to send the processed first terahertz wave;
wherein the antenna array is further configured to:
receive a second terahertz wave; and
send the second terahertz wave to the first beamforming network;
wherein the first beamforming network is further configured to:
perform beamforming processing on the second terahertz wave, to obtain a processed second terahertz wave; and
send the processed second terahertz wave to the first terahertz transceiver; and
wherein the first terahertz transceiver is further configured to perform demodulation processing on the processed second terahertz wave.

12. The spacecraft communications system according to claim 11, wherein:
the first terahertz transceiver system further comprises a fifth terahertz transceiver that supports a first frequency band, the first beamforming network further comprises a beamforming network that supports the first frequency band, and the fifth terahertz transceiver that supports the first frequency band, the beamforming network that supports the first frequency band, and the antenna array are sequentially connected; and
the first controller is further configured to:
control, in an acquisition phase, the beamforming network that supports the first frequency band to perform terahertz wave beamforming processing using a first beamwidth; and
control, in a tracking phase and a pointing phase, the beamforming network that supports the first frequency band to perform terahertz wave beamforming processing using a second beamwidth, wherein the second beamwidth is greater than the first beamwidth.

13. The spacecraft communications system according to claim 11, wherein the first controller is configured to:
control, in an acquisition phase of each terahertz transceiver of the first APT subsystem, a beamforming network connected to the corresponding terahertz transceiver to perform terahertz wave beamforming processing using a third beamwidth; and
control, in a tracking phase and a pointing phase of each terahertz transceiver of the first APT subsystem, the beamforming network connected to the corresponding terahertz transceiver to perform terahertz wave beamforming processing using a fourth beamwidth, wherein the third beamwidth is greater than the fourth beamwidth.

* * * * *